(12) United States Patent
Shichino et al.

(10) Patent No.: US 12,322,983 B2
(45) Date of Patent: Jun. 3, 2025

(54) POWER TRANSMISSION APPARATUS, CONTROL METHOD OF POWER TRANSMISSION APPARATUS, AND STORAGE MEDIUM

(71) Applicant: CANON KABUSHIKI KAISHA, Tokyo (JP)

(72) Inventors: Takahiro Shichino, Tokyo (JP); Kazuo Moritomo, Kanagawa (JP); Hajime Iwase, Kanagawa (JP); Tomoki Hiramatsu, Tokyo (JP); Hajime Shimura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/313,693

(22) Filed: May 8, 2023

(65) Prior Publication Data
US 2023/0318362 A1 Oct. 5, 2023

Related U.S. Application Data

(63) Continuation of application No. PCT/JP2021/040528, filed on Nov. 4, 2021.

(30) Foreign Application Priority Data

Nov. 12, 2020 (JP) ................................. 2020-188572

(51) Int. Cl.
*H02J 50/40* (2016.01)
*H02J 50/10* (2016.01)
(Continued)

(52) U.S. Cl.
CPC ............. *H02J 50/40* (2016.02); *H02J 50/10* (2016.02); *H02J 50/60* (2016.02); *H02J 50/80* (2016.02); *H02J 50/90* (2016.02)

(58) Field of Classification Search
CPC .. H02J 50/40; H02J 50/80; H02J 50/90; H02J 50/10; H02J 50/60
(Continued)

(56) References Cited

U.S. PATENT DOCUMENTS

| 11,018,530 B2 | 5/2021 | Narayana Bhat |
| 2005/0213355 A1* | 9/2005 | Koike ..................... H02M 1/10 363/21.16 |

(Continued)

FOREIGN PATENT DOCUMENTS

| JP | 2012100491 A | 5/2012 |
| JP | 2015533472 A | 11/2015 |

(Continued)

*Primary Examiner* — Alfonso Perez Borroto
(74) *Attorney, Agent, or Firm* — Canon U.S.A., Inc., IP Division

(57) ABSTRACT

A power transmission apparatus includes a first power transmission unit configured to perform wireless power transmission to a power receiving apparatus in a first region by using at least one of a plurality of coils, a second power transmission unit configured to perform wireless power transmission to a power receiving apparatus in a second region by using at least one of the plurality of coils. In a case where, while the first power transmission unit performs wireless power transmission to a first power receiving apparatus in a common region where the first region and the second region overlap, a second power receiving apparatus is placed in a region of the first region other than the common region, the first power transmission unit stops the wireless power transmission to the first power receiving apparatus and the second power transmission unit performs wireless power transmission to the first power receiving apparatus.

5 Claims, 20 Drawing Sheets

(51) Int. Cl.
*H02J 50/60* (2016.01)
*H02J 50/80* (2016.01)
*H02J 50/90* (2016.01)

(58) Field of Classification Search
USPC .......................................................... 307/104
See application file for complete search history.

(56) References Cited

U.S. PATENT DOCUMENTS

| | | | |
|---|---|---|---|
| 2008/0197713 A1* | 8/2008 | Jin | H02J 7/00045 |
| | | | 307/104 |
| 2009/0001818 A1* | 1/2009 | Iisaka | H02J 7/0034 |
| | | | 307/104 |
| 2009/0127936 A1* | 5/2009 | Kamijo | H02J 50/60 |
| | | | 307/104 |
| 2010/0084918 A1 | 4/2010 | Fells et al. | |
| 2010/0133917 A1* | 6/2010 | Sekino | H02J 50/12 |
| | | | 307/104 |
| 2010/0171367 A1* | 7/2010 | Kitamura | H02J 7/00712 |
| | | | 320/108 |
| 2012/0112539 A1* | 5/2012 | Yamamoto | H02J 50/80 |
| | | | 307/104 |
| 2018/0091000 A1* | 3/2018 | Jol | H04B 5/24 |
| 2018/0097403 A1 | 4/2018 | Jung | |
| 2018/0301933 A1 | 10/2018 | Lee et al. | |
| 2019/0027298 A1* | 1/2019 | Jadidian | H02J 50/70 |
| 2019/0081517 A1* | 3/2019 | Graham | G01K 7/22 |
| 2019/0326782 A1 | 10/2019 | Graham | |
| 2022/0393516 A1 | 12/2022 | Shimura | |

FOREIGN PATENT DOCUMENTS

| | | |
|---|---|---|
| JP | 2016007123 A | 1/2016 |
| JP | 2016178721 A | 10/2016 |
| JP | 2018085929 A | 5/2018 |
| JP | 2018186699 A | 11/2018 |
| JP | 2019004566 A | 1/2019 |
| JP | 2019170036 A | 10/2019 |
| JP | 2020022358 A | 2/2020 |
| WO | 2019195882 A1 | 10/2019 |

* cited by examiner

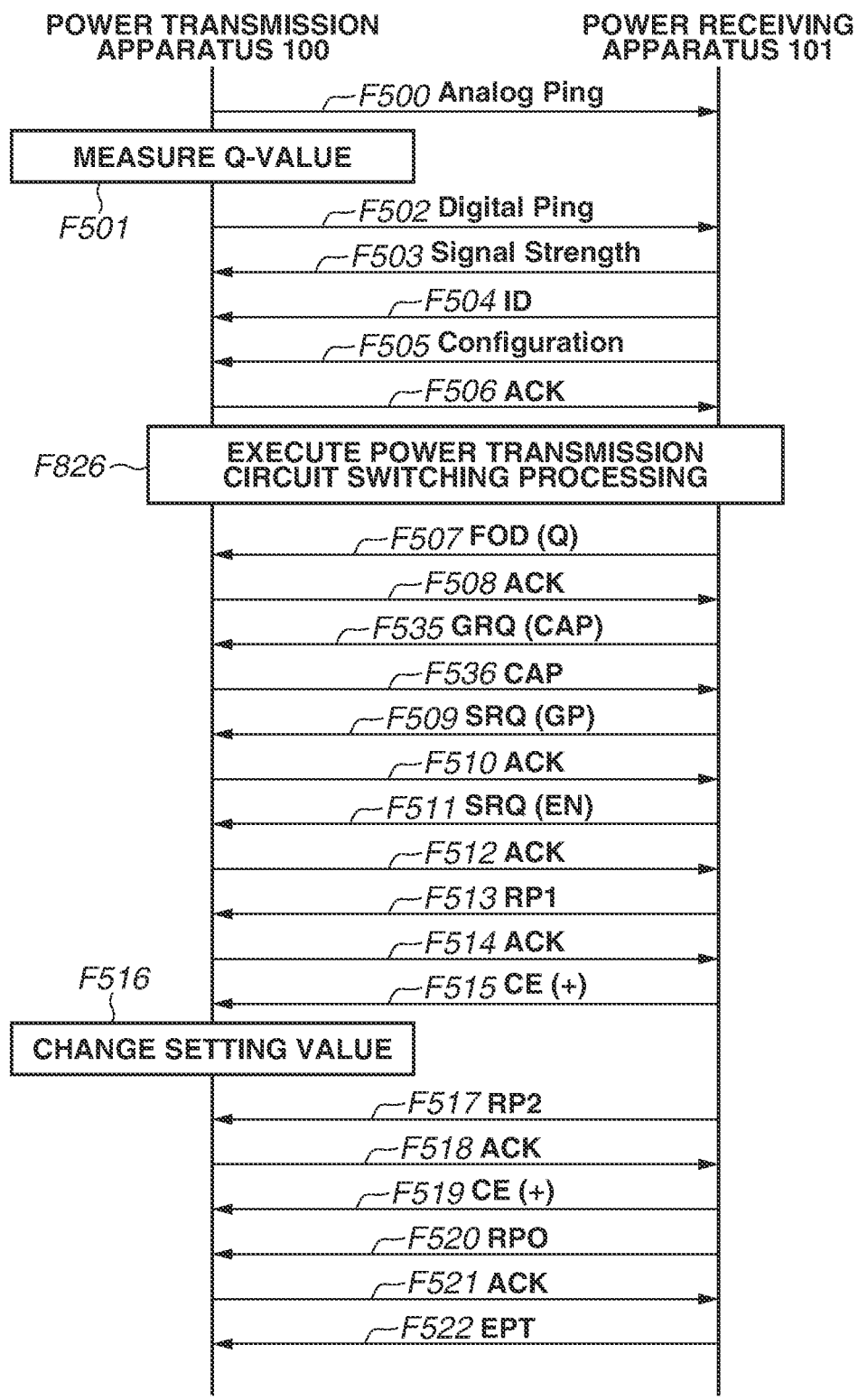

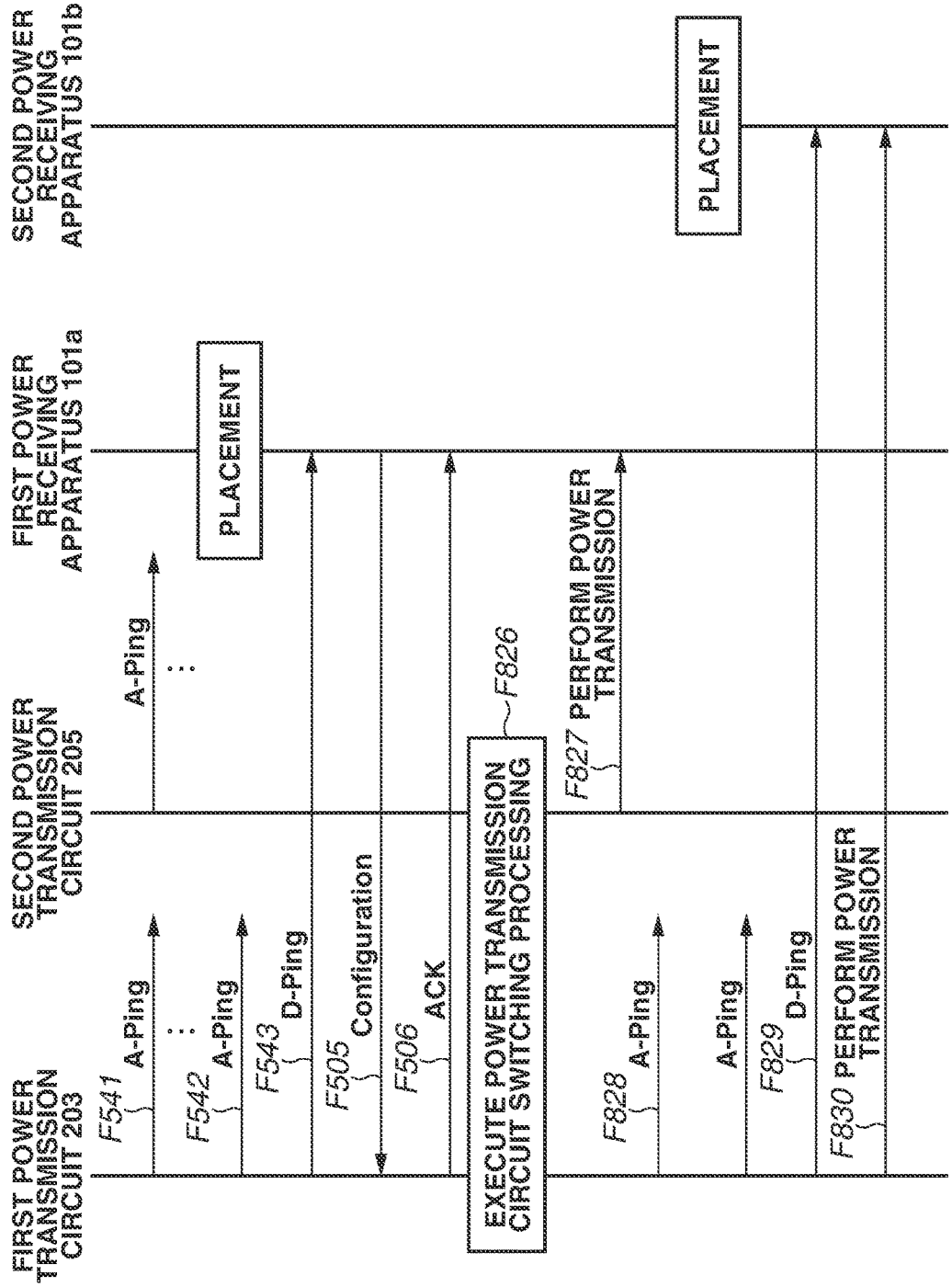

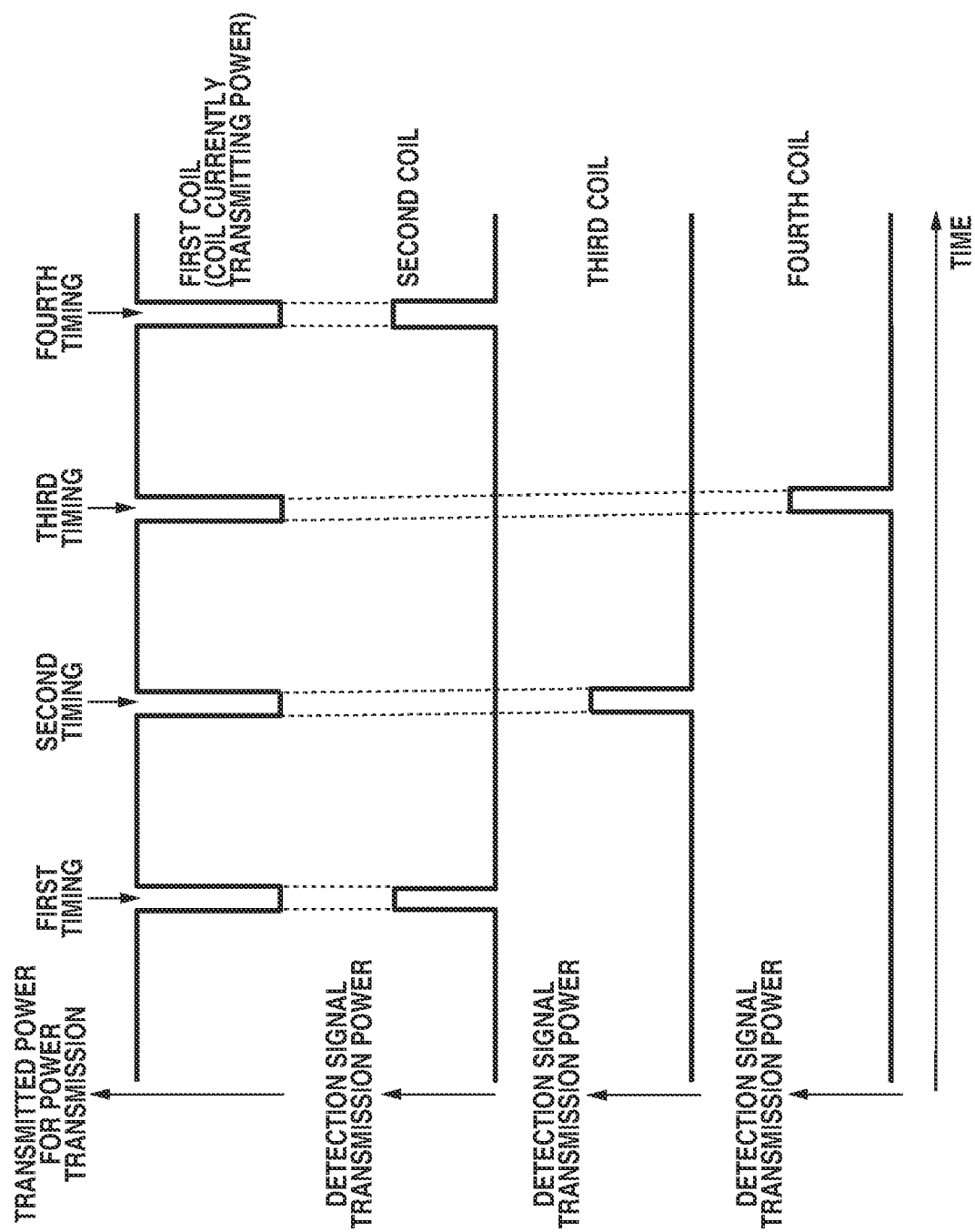

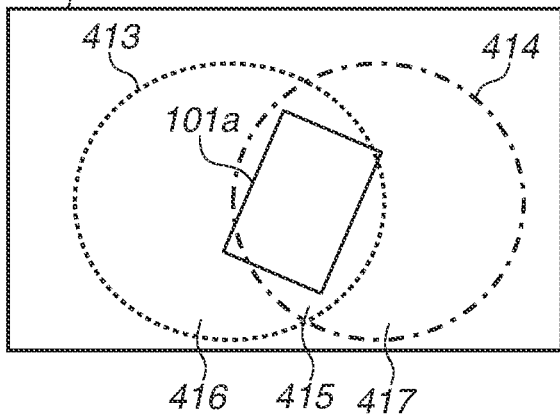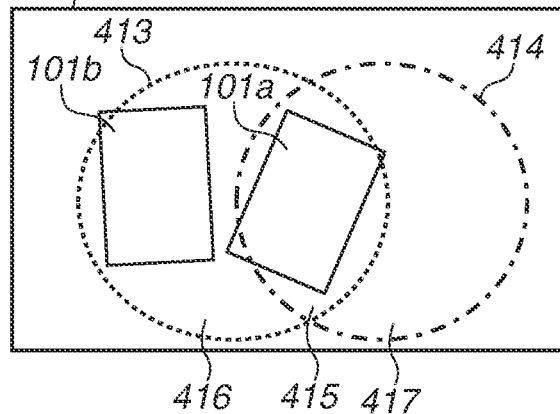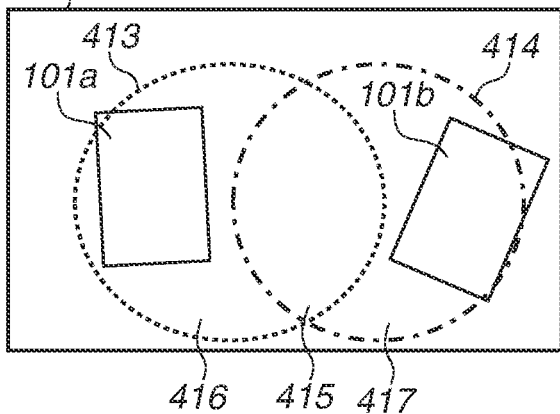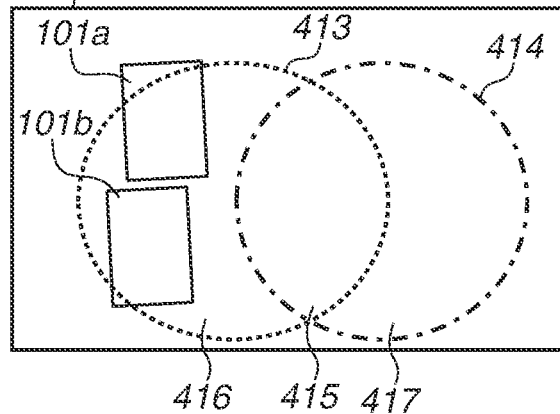

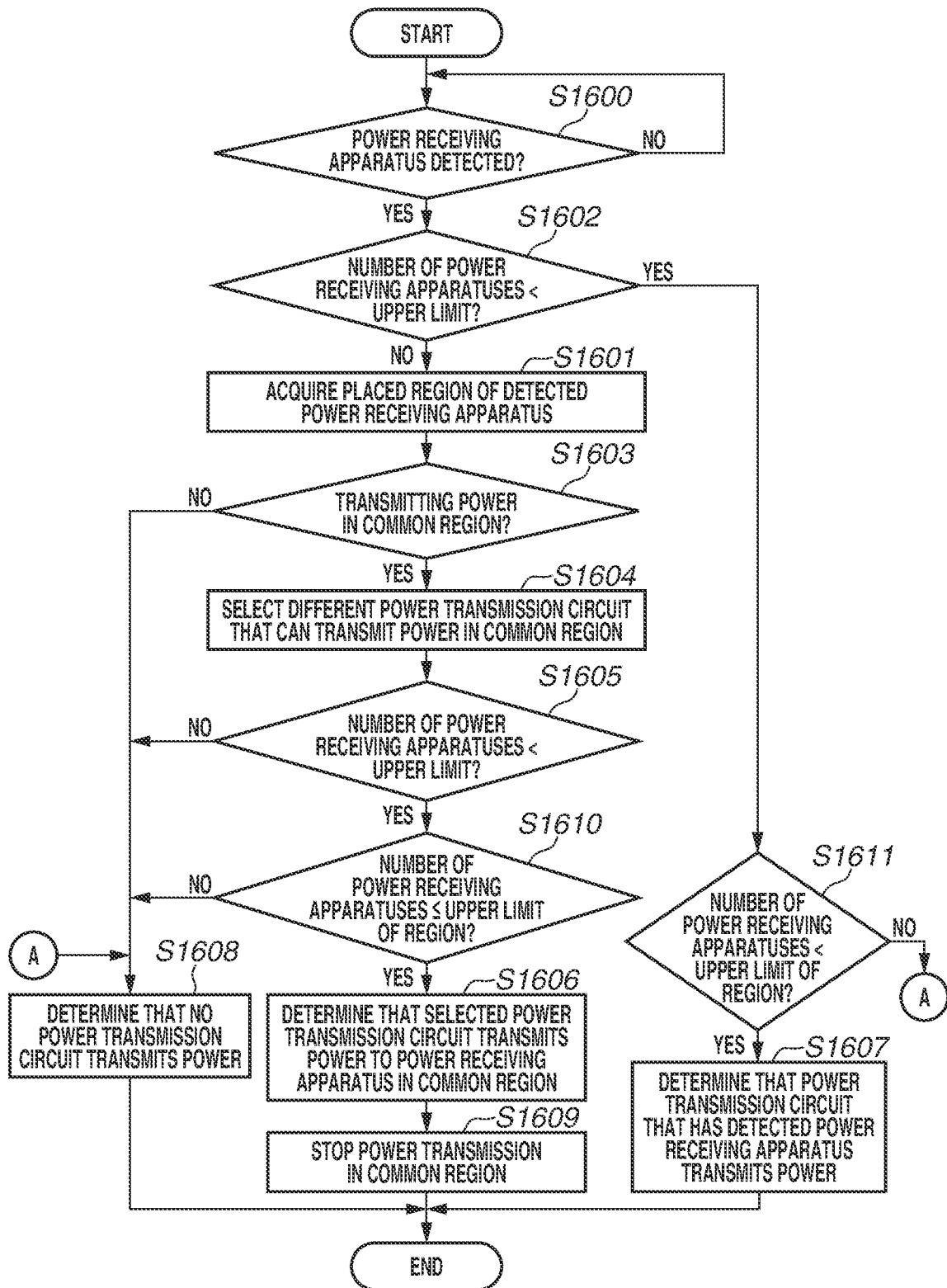

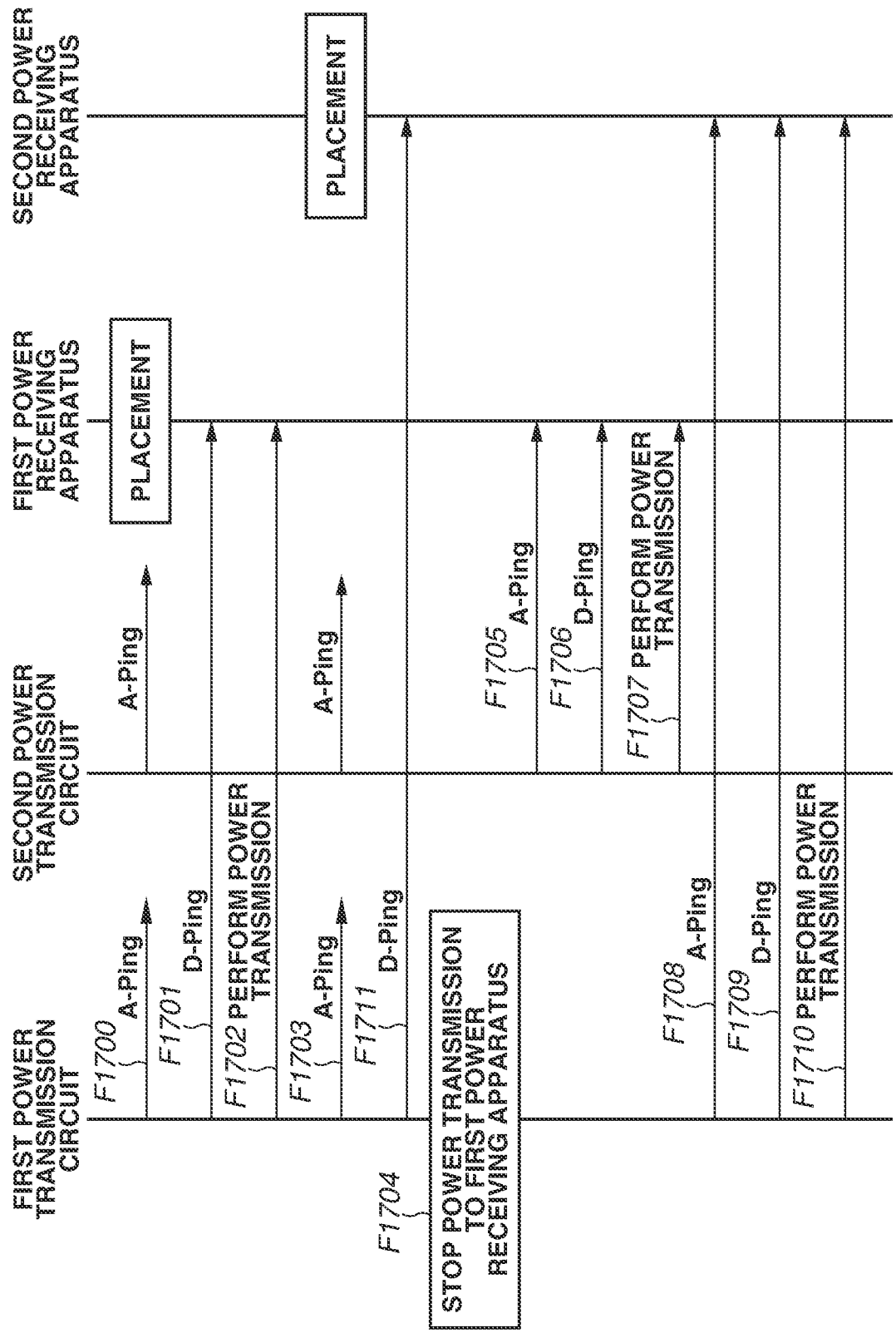

POWER TRANSMISSION APPARATUS, CONTROL METHOD OF POWER TRANSMISSION APPARATUS, AND STORAGE MEDIUM

CROSS-REFERENCE TO RELATED APPLICATIONS

This application is a Continuation of International Patent Application No. PCT/JP2021/040528, filed Nov. 4, 2021, which claims the benefit of Japanese Patent Application No. 2020-188572, filed Nov. 12, 2020, both of which are hereby incorporated by reference herein in their entirety.

BACKGROUND

Field

The present disclosure relates to a power transmission apparatus, a control method of a power transmission apparatus, and a storage medium.

Background Art

In recent years, the technical development of wireless power transmission systems has been widely performed. In addition, there have been provided a power transmission apparatus and a power receiving apparatus in compliant with a standard developed by the Wireless Power Consortium (WPC) (hereinafter, will be referred to as a WPC standard), which is a standard-setting organization of wireless charging standards.

Japanese Patent Application Laid-Open No. 2018-186699 discusses a power transmission apparatus including a plurality of power transmission coils.

CITATION LIST

Patent Literature

PTL 1: Japanese Patent Laid-Open No. 12018-186699

Japanese Patent Application Laid-Open 2018-186699 discusses an arrangement of the plurality of power transmission coils, but the discussed technique may be insufficient for a control method of wireless power transmission of the power transmission apparatus including the plurality of power transmission coils.

SUMMARY

The present disclosure is directed to providing a technique that can perform appropriate control regarding wireless power transmission in a power transmission apparatus including a plurality of power transmission coils.

According to an aspect of the present disclosure, a power transmission apparatus includes a first power transmission unit configured to perform wireless power transmission to a power receiving apparatus in a first region by using at least one of a plurality of coils, and a second power transmission unit configured to perform wireless power transmission to a power receiving apparatus in a second region by using at least one of the plurality of coils, wherein, in a case where, while the first power transmission unit performs wireless power transmission to a first power receiving apparatus in a common region where the first region and the second region overlap, a second power receiving apparatus is placed in a region of the first region other than the common region, the first power transmission unit stops the wireless power transmission to the first power receiving apparatus and the second power transmission unit performs wireless power transmission to the first power receiving apparatus.

Further features of the present disclosure will become apparent from the following description of exemplary embodiments with reference to the attached drawings.

BRIEF DESCRIPTION OF THE DRAWINGS

FIG. 9A is a sequence diagram illustrating processing that is performed by a power transmission apparatus and a power receiving apparatus according to a second exemplary embodiment.

FIG. 9B is a sequence diagram illustrating processing that is performed by the power transmission apparatus and the power receiving apparatus according to the second exemplary embodiment.

FIG. 16 is a diagram illustrating timings of power transmission and detection signal transmission that is performed by a power transmission apparatus.

FIG. 17A is a diagram illustrating an example of arrangement of a power receiving apparatus.

FIG. 17B is a diagram illustrating an example of arrangement of a power receiving apparatus.

FIG. 17C is a diagram illustrating an example of arrangement of a power receiving apparatus.

FIG. 17D is a diagram illustrating an example of arrangement of a power receiving apparatus.

FIG. 18 is a flowchart illustrating processing that is performed by a power transmission apparatus according to a fifth exemplary embodiment.

FIG. 19 is a sequence diagram illustrating processing that is performed by a power transmission apparatus and a power receiving apparatus according to the fifth exemplary embodiment.

DESCRIPTION OF THE EMBODIMENTS

Hereinafter, exemplary embodiments of the present disclosure will be described with reference to the drawings. Components to be described in the following exemplary embodiments each indicate an example of an exemplary embodiment of the present disclosure, and are not intended to limit the present disclosure to these.

[Configuration of System]

Figure 1:
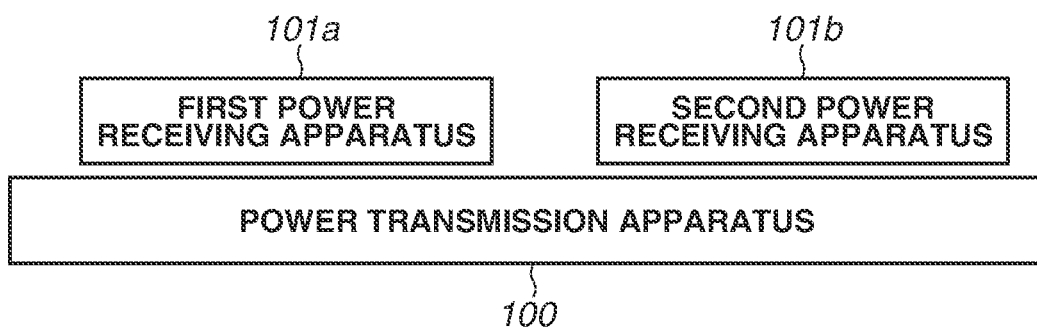
FIG. 1 is a diagram illustrating a configuration of a wireless power transmission system.

FIG. 1 illustrates an example of a wireless power transmission system according to the present exemplary embodiment. The wireless power transmission system according to the present exemplary embodiment includes a power transmission apparatus 100 and a power receiving apparatus 101. The power transmission apparatus 100 according to the present exemplary embodiment has a function of simultaneously charging the first power receiving apparatus 101a and the second power receiving apparatus 101b that are placed within a power-transmissible range of the power transmission apparatus 100. While, FIG. 1 illustrates an example in which two power receiving apparatuses are on a power transmission apparatus, the configuration is not limited to this. For example, the power transmission apparatus 100 can perform charging to one power receiving apparatus. The power transmission apparatus 100 can have a configuration of simultaneously charging three or more power receiving apparatuses.

In the present exemplary embodiment, a state in which a power receiving apparatus is placed includes the following state. The state in which a power receiving apparatus is placed includes a case where a power receiving apparatus is placed (installed) on a surface within a power-transmissible range of a power transmission apparatus, for example. Nevertheless, a method to be described in the present exemplary embodiment is applicable in a state in which at least a power receiving apparatus is within a power-transmissible range of a power transmission apparatus, and the method may be applied in a state in which a power receiving apparatus and a power transmission apparatus are contactless, for example. The surface on which a power receiving apparatus is placed is not limited to a horizontal surface. Alternatively, a vertical surface and a slanted surface can also be used.

[Apparatus Configuration]

Figure 2:
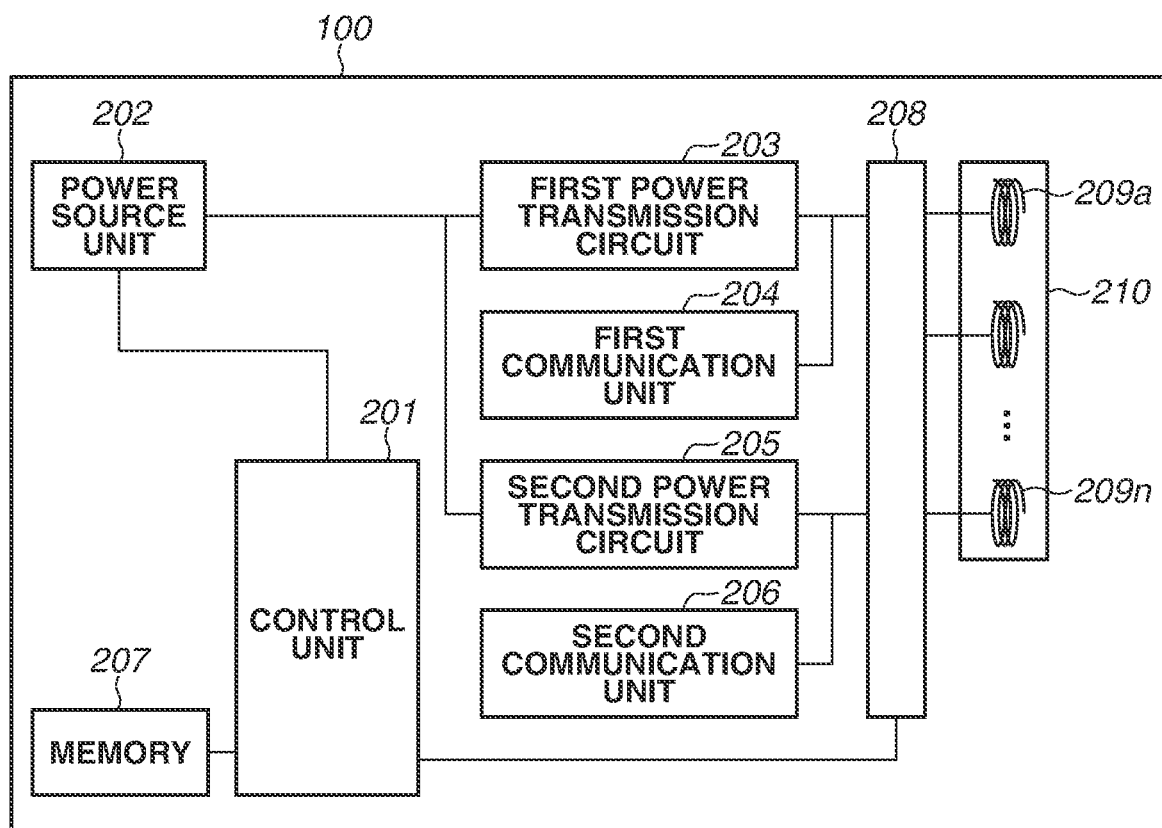
FIG. 2 is a diagram illustrating an example of a functional configuration of a power transmission apparatus.

FIG. 2 is a block diagram illustrating a functional configuration of the power transmission apparatus 100. The power transmission apparatus 100 includes a control unit 201, a power source unit 202, a first power transmission circuit 203, a first communication unit 204, a second power transmission circuit 205, a second communication unit 206, a memory 207, a selection unit 208, and a power transmission coil unit 210. The power transmission coil unit 210 includes a plurality of power transmission coils 209a to 209n. The number of power transmission coils 209a to 209n can be two or more. In the following description, each of the power transmission coils 209a to 209n will be simply described as the power transmission coil 209 except when specific discrimination is required. Hereinafter, each processing unit will be described.

The control unit 201 performs entire control of the power transmission apparatus 100. The control unit 201 includes one or more processors, such as a central processing unit (CPU) or a micro processing unit (MPU). The control unit 201 can include an application specific integrated circuit (ASIC) or a field programmable gate array (FPGA) that is configured to execute processing to be described below.

The power source unit 202 is a power source that supplies power for operation of the control unit 201, the first power transmission circuit 203, and the second power transmission circuit 205. The power source unit 202 can be a wired power receiving circuit that receives power supply from a commercial power source, or a battery, for example.

Each of the first power transmission circuit 203 and the second power transmission circuit 205 generates an alternating-current voltage and an alternating current in a certain power transmission coil 209 included in the power transmission coil unit 210 to be described below. Each of the first power transmission circuit 203 and the second power transmission circuit 205 converts a direct-current voltage supplied from the power source unit 202, into an alternating-current voltage using a switching circuit with a half-bridge or full-bridge configuration that uses a field effect transistor (FET), for example. In this case, each of the first power transmission circuit 203 and the second power transmission circuit 205 includes a gate driver that controls ON/OFF of the FET.

The first communication unit 204 performs control communication of wireless power transmission that is based on a standard (hereinafter, will be referred to as a WPC standard) developed by the Wireless Power Consortium (WPC), with a communication unit of the power receiving apparatus, which will be described below. In the present exemplary embodiment, the first communication unit 204 transmits communication data to the power receiving apparatus by load-modulating an alternating-current voltage or an alternating current generated by the first power transmission circuit 203 and superimposing the communication data on the power to be transmitted. In addition, the first communication unit 204 receives the communication data transmitted from the power receiving apparatus by demodulating an alternating-current voltage or an alternating current modulated by the communication unit of the power receiving apparatus, which will be described below. By the processing, control communication is implemented. Similarly to the first communication unit 204, the second communication unit 206 implements control communication by load-modulating or demodulating an alternating-current voltage or an alternating current generated by the second power transmission circuit 205 and performing transmission and reception of communication data.

The memory 207 stores states of components of the power transmission apparatus 100 and the wireless power transmission system, and entire states of the power transmission apparatus 100 and the wireless power transmission system.

The power transmission coil unit 210 includes the plurality of power transmission coils 209. A certain one or some of the power transmission coils 209 of the plurality of power transmission coils 209 is connected to the first power transmission circuit 203 or the second power transmission circuit 205. The selection unit 208 connects the certain one or the some of the power transmission coils 209 included in the power transmission coil unit 210 to the first power transmission circuit 203 or the second power transmission circuit 205. The selection unit 208 connects the first power transmission circuit 203 to one or some of the power transmission coils 209 and connects the second power transmission circuit 205 to a different one or different ones of the power transmission coils 209. The power transmission coils 209 to be connected with the first power transmission circuit 203 and the second power transmission circuit 205 are determined by the control unit 201 controlling the selection unit 208. In accordance with control performed by the control unit 201, the selection unit 208 switches connection between the first power transmission circuit 203 and the second power transmission circuit 205, and power transmission coils 209. The control of connection between the first power transmission circuit 203 and the second power transmission circuit 205, and the power transmission coils 209 will be described below.

The first power transmission circuit 203 and the second power transmission circuit 205 according to the present exemplary embodiment can independently operate, and each can simultaneously transmit power for charging up to one power receiving apparatus. That is, the power transmission apparatus 100 can perform simultaneous charging up to two power receiving apparatuses.

In FIG. 2, the control unit 201, the power source unit 202, the first power transmission circuit 203, the first communication unit 204, the second power transmission circuit 205, the second communication unit 206, the memory 207, the selection unit 208, and the power transmission coil unit 210 are illustrated as separate blocks, but the configuration is not limited to this. Two or more blocks of the above-described blocks can be combined in one chip. One block can be divided into a plurality of blocks.

Figure 3:
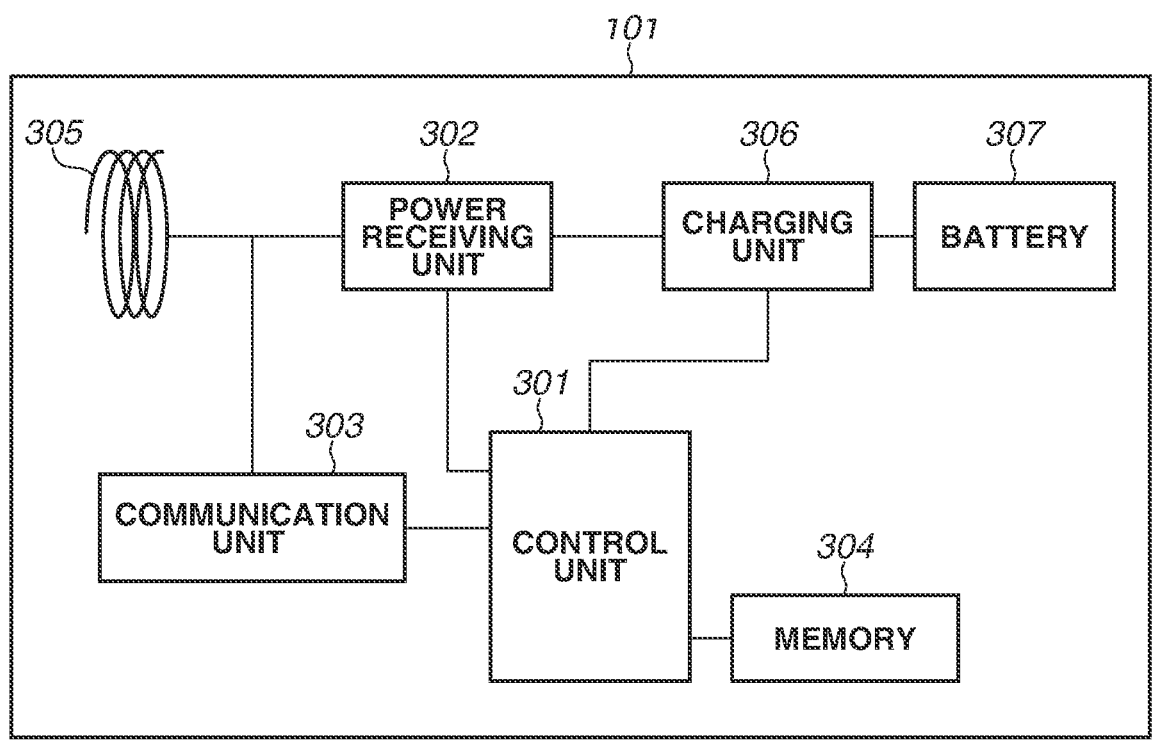
FIG. 3 is a diagram illustrating an example of a functional configuration of a power receiving apparatus.

FIG. 3 is a block diagram illustrating functional configuration of the first power receiving apparatus 101a and the second power receiving apparatus 101b. The first power receiving apparatus 101a and the second power receiving apparatus 101b according to the present exemplary embodiment have a similar functional configuration, and will be simply described as a power receiving apparatus 101 except when specific discrimination is required. The first power receiving apparatus 101a and the second power receiving apparatus 101b can be devices of different types. The power receiving apparatus 101 includes a control unit 301, a power receiving unit 302, a communication unit 303, a memory 304, a power receiving coil 305, a charging unit 306, and a battery 307. Hereinafter, each processing unit will be described.

The control unit 301 controls entire operation of the power receiving apparatus 101. The control unit 301 includes one or more processors, such as a CPU or an MPU. The control unit 301 can include an ASIC or an FPGA that is configured to execute processing to be described below. The control unit 301 starts up by receiving predetermined power from the power transmission apparatus 100.

The power receiving unit 302 acquires an alternating-current voltage and an alternating current generated in the power receiving coil 305 by power transmission from certain one or more power transmission coils 209 included in the power transmission coil unit 210. The power receiving unit 302 converts the acquired alternating-current voltage and alternating current into a direct-current voltage and a direct current for operation of the control unit 301 and the charging unit 306.

The communication unit 303 performs control communication of wireless power transmission that is based on a WPC standard, with the first communication unit 204 or the second communication unit 206 of the power transmission apparatus 100. The communication unit 303 transmits communication data to the power transmission apparatus 100 by load-modulating an alternating-current voltage and an alternating current that have been received by the power receiving coil 305. In addition, the communication unit 303 receives communication data transmitted from the power transmission apparatus 100 by demodulating an alternating-current voltage and an alternating current that have been modulated by the power transmission apparatus 100.

The charging unit 306 charges the battery 307 using a direct-current voltage and a direct current that are supplied from the power receiving unit 302. The memory 304 stores states of components of the power receiving apparatus 101 and the wireless power transmission system, and entire states of the power receiving apparatus 101 and the wireless power transmission system.

In FIG. 3, the control unit 301, the power receiving unit 302, the communication unit 303, the memory 304, and the charging unit 306 are illustrated as separate blocks, but the configuration is not limited to this. Two or more blocks of the above-described blocks can be combined in one chip. One block can be divided into a plurality of blocks.

The power receiving apparatus 101 and the power transmission apparatus 100 can have a function of executing an application other than wireless charging. An example of the power receiving apparatus 101 is a smartphone, and an example of the power transmission apparatus 100 is an accessory device for charging the smartphone. The power receiving apparatus 101 and the power transmission apparatus 100 can be storage devices, such as a hard disk device or a memory device, or may be information processing apparatuses, such as a personal computer (PC). The power receiving apparatus 101 and the power transmission apparatus 100 can be imaging apparatuses (camera, video camera, etc.), can be image input apparatuses, such as a scanner, or can be image output apparatuses, such as a printer, a copier, or a projector, for example. The power transmission apparatus 100 may be a smartphone. In this case, the power receiving apparatus 101 can be a different smartphone, or can be wireless earphones. The power transmission apparatus 100 can be a battery charger installed in a console in an automobile.

Next, a configuration of the power transmission coil unit 210 included in the power transmission apparatus 100 according to the present exemplary embodiment will be described with reference to FIGS. 4A to 4E. FIGS. 4A to 4E are top views of the power transmission coil unit 210. More specifically, FIGS. 4A to 4E illustrate an arrangement of the plurality of power transmission coils 209 on an x-y two-dimensional plane. The actual arrangement of the plurality of power transmission coils 209 can be in a three-dimensional space including a height direction. The arrangement of a plurality of power transmission coils 209 illustrated in FIGS. 4A to 4E is an example, and the arrangement is not limited to this. In the following description, power transmission coils 400 to 411 each correspond to a different coil of the plurality of power transmission coils 209 included in the power transmission coil unit 210.

Figure 4A:
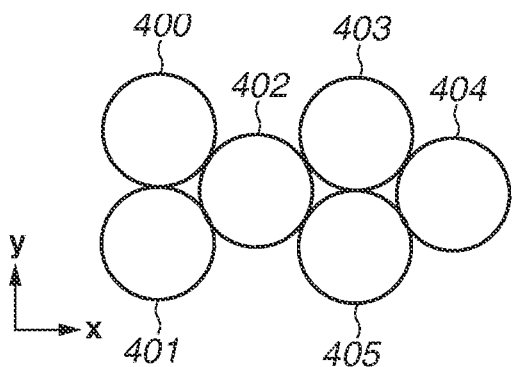
FIG. 4A is a diagram illustrating an example of a configuration of a power transmission coil unit included in the power transmission apparatus.
Figure 4B:
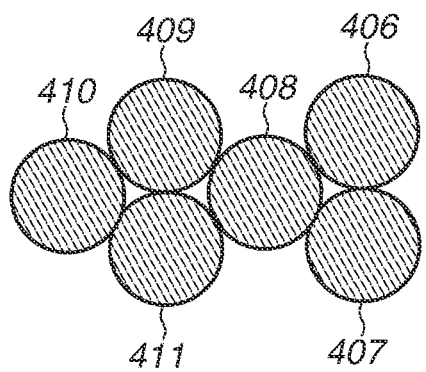
FIG. 4B is a diagram illustrating an example of a configuration of the power transmission coil unit included in the power transmission apparatus.

FIGS. 4A and 4B are top views each illustrating a part of the power transmission coil unit 210. FIG. 4A illustrates the arrangement of six circular coils corresponding to the power transmission coils 400 to 405. The power transmission coils 400, 401, and 402 are arranged in such a manner that each of the circumferences of the power transmission coils 400, 401, and 402 is in contact with the circumferences of the other two power transmission coils. Similarly, the power transmission coils 403, 404, and 405 are arranged in such a manner that each of the circumferences of the power transmission coils 403, 404, and 405 is in contact with the circumferences of the other two power transmission coils. Similarly, the power transmission coils 402, 403, and 405 are arranged in such a manner that each of the circumferences of the power transmission coils 402, 403, and 405 is in contact with the circumferences of the other two power transmission coils.

FIG. 4B illustrates the arrangement of six circular coils corresponding to the power transmission coils 406 to 411. The arrangement of the power transmission coils 406 to 411 that is illustrated in FIG. 4B corresponds to mirror-reversed arrangement of the power transmission coils 400 to 405 that is illustrated in FIG. 4A. The power transmission coils 409, 410, and 411 are arranged in such a manner that each of the circumferences of the power transmission coils 409, 410, and 411 is in contact with the circumferences of the other two power transmission coils. Similarly, the power transmission coils 406, 407, and 408 are arranged in such a manner that each of the circumferences of the power transmission coils 406, 407, and 408 is in contact with the circumferences of the other two power transmission coils. Similarly, the power transmission coils 408, 409, and 411 are arranged in such a manner that each of the circumferences of the power transmission coils 408, 409, and 411 is in contact with the circumferences of the other two power transmission coils.

Figure 4C:
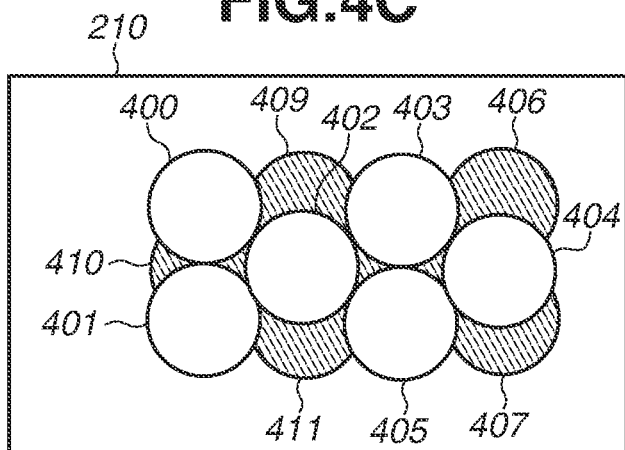
FIG. 4C is a diagram illustrating an example of a configuration of the power transmission coil unit included in the power transmission apparatus.

FIG. 4C is a top view of the power transmission coil unit 210. The power transmission coil unit 210 includes the power transmission coils 400 to 405 illustrated in FIG. 4A that are disposed over the power transmission coils 406 to 411 illustrated in FIG. 4B.

Figure 4D:
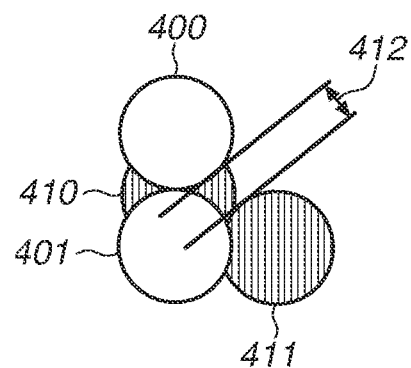
FIG. 4D is a diagram illustrating an example of a configuration of the power transmission coil unit included in the power transmission apparatus.

FIG. 4D is a diagram illustrating a positional relationship between power transmission coils. FIG. 4D illustrates the power transmission coils 400, 401, 410, and 411 in the power transmission coil unit 210 illustrated in FIG. 4C. The power transmission coil 400 overlaps the power transmission coil 410 in a top view. Power transmission coils having such a positional relationship are represented as "overlapping". Similarly, the power transmission coil 401 overlaps the power transmission coil 410. On the other hand, the power transmission coils 400 and 411 do not overlap each other in a top view. Power transmission coils having such a positional relationship are represented as "not overlapping".

A distance 412 is a distance between a tangent line of the circumference of the power transmission coil 400 and a tangent line of the circumference of the power transmission coil 411. Each tangent line passes through an intersection point of a straight line connecting the circle center of the power transmission coil 400 and the circle center of the power transmission coil 411, and the circumference of a corresponding power transmission coil. In other words, the distance 412 is the shortest distance between the power transmission coils 400 and 411, and indicates that the power transmission coils 400 and 411 are separated by the distance 412. In the present exemplary embodiment, a distance between power transmission coils 400 to 411 is defined as a distance between positions on the power transmission coils 400 to 411 in a top view of the power transmission coils 400 to 411, but the definition of the distance is not limited to this. For example, centroids or the like of power transmission coils 400 to 411 are set as reference points, and a distance between the reference points of the power transmission coils 400 to 411 can be defined as a distance between the power transmission coils 400 to 411. The distance 412 in FIG. 4D is a distance on the x-y plane, but a plurality of coils can be arranged at any positions in a three-dimensional space including a z-axis direction. Also in this case, similarly, a distance between power transmission coils can be the shortest distance between the power transmission coils in an xyz space, or can be a distance between reference points of the power transmission coils.

The power transmission coils 400 to 411 have been described as circular coils, but the shape is not limited to this. The power transmission coil 400 to 411 can be coils having a quadrangular rectangular shape, for example.

Figure 4E:
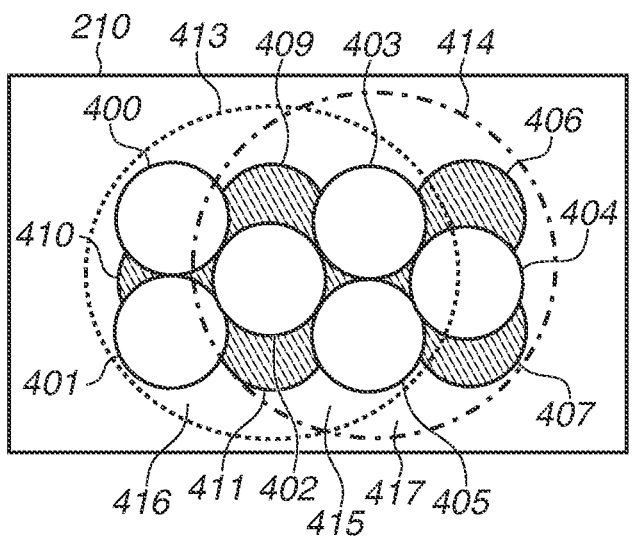
FIG. 4E is a diagram illustrating an example of a configuration of the power transmission coil unit included in the power transmission apparatus.

FIG. 4E is a diagram illustrating power-transmissible ranges of the first power transmission circuit 203 and the second power transmission circuit 205. The first power transmission circuit 203 according to the present exemplary embodiment can connect with the power transmission coils 400, 401, 402, 403, 405, 408, 409, 410, and 411. The first power transmission circuit 203 is thus capable of transmitting power to the power receiving apparatus 101 placed in a region 413 indicated by a dotted line. The second power transmission circuit 205 according to the present exemplary embodiment can connect with the power transmission coils 402, 403, 404, 405, 406, 407, 408, 409, and 411. The second power transmission circuit 205 is thus capable of transmitting power to the power receiving apparatus 101 placed in a region 414 indicated by a dashed-dotted line.

A region 415 is a common region where the regions 413 and 414 overlap each other. The common region 415 corresponds to power-transmissible ranges of the power transmission coils 402, 403, 405, 408, 409, and 411, and the power transmission coils 402, 403, 405, 408, 409, and 411 are connectable with both of the first power transmission circuit 203 and the second power transmission circuit 205. In other words, the power receiving apparatus 101 placed in the common region 415 receives power transmitted from either of the first power transmission circuit 203 and the second power transmission circuit 205. In the following description, the common region 415 will be represented as a common region 415. A region in the region 413 with the exclusion of the common region 415 will be represented as a dedicated region 416 of the first power transmission circuit 203. The power receiving apparatus 101 placed in the dedicated region 416 is able to be charged only from the first power transmission circuit 203. A region in the region 414 with the exclusion of the common region 415 will be represented as a dedicated region 417 of the second power transmission circuit 205. The power receiving apparatus 101 placed in the dedicated region 417 is able to be charged only from the second power transmission circuit 205.

Figure 5:
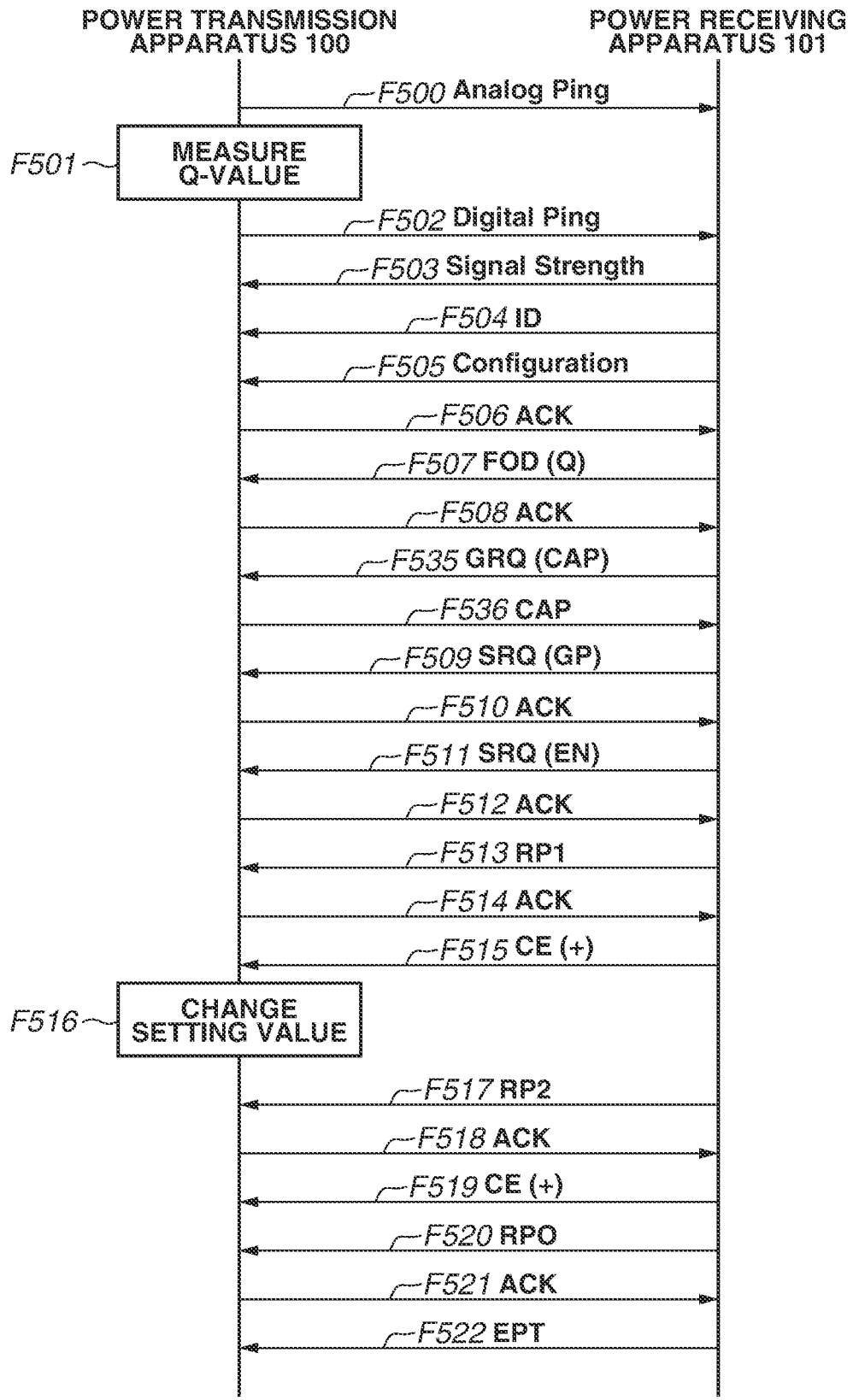
FIG. 5 is a diagram illustrating processing that is performed by a power transmission apparatus and a power receiving apparatus in compliant with a Wireless Power Consortium (WPC) standard.

Next, a procedure of control that is performed between the power transmission apparatus 100 and the power receiving apparatus 101 according to the present exemplary embodiment will be described. First of all, the control of wireless power transmission in compliant with a WPC standard will be described. FIG. 5 is a sequence diagram illustrating a procedure of control that is performed between a power transmission apparatus 100 and a power receiving apparatus 101 that are in compliant with a WPC standard v1.2.3. The sequence illustrated in FIG. 5 is a sequence of control that is executed by a power transmission apparatus having a configuration adapted to a WPC standard, and the power transmission apparatus is not limited to the power transmission apparatus 100 including a plurality of power transmission coils and a plurality of power transmission circuits as in the present exemplary embodiment. In the following description, the power transmission apparatus 100 transmits power to the power receiving apparatus 101 using a certain power transmission coil 209. While, the following description will be given of a case where a power transmission apparatus 100 and a power receiving apparatus 101 in compliant with the WPC standard v1.2.3, the version of the WPC standard is not limited to this. That is, the power transmission apparatus 100 and a power receiving apparatus 101 of the present disclosure can be a power transmission apparatus and a power receiving apparatus in compliant with a WPC standard of a version newer than the WPC standard v1.2.3, or a version older than the WPC standard v1.2.3.

The WPC standard defines a plurality of phases including a power transfer phase in which power transmission for charging is executed, and phases prior to the execution of the power transmission for charging. The phases prior to the execution of the power transmission include (1) a selection phase, (2) a ping phase, (3) an identification & configuration phase, (4) a negotiation phase, and (5) a calibration phase. Hereinafter, the identification and configuration phase will be referred to as an I & C phase.

In step F500 in the selection phase, the power transmission apparatus 100 transmits an analog ping (hereinafter, will be referred to as an "A-ping") to detect an object in the proximity of the power transmission coil 209. A control method of an A-ping according to the present exemplary embodiment will be described below. The A-ping is pulsed power and power for detecting an object. The A-ping is power not able to start up the control unit 301 of the power receiving apparatus 101 even in a case where the power receiving apparatus 101 receives the A-ping. The power transmission apparatus 100 intermittently transmits the A-ping. In this process, a voltage and a current to be applied to the power transmission coil 209 vary between a case where an object is placed within a power-transmissible range of the power transmission apparatus 100, and a case where no object is placed within the power-transmissible range. The control unit 201 of the power transmission apparatus 100 detects at least either one of a voltage value and a current value of the power transmission coil 209 that are obtained when the A-ping is transmitted. In a case where the detected voltage value falls below a certain threshold value or in a case where the detected current value exceeds a certain threshold value, the control unit 201 determines that an object exists, and the power transmission apparatus 100 transitions to the ping phase.

In the ping phase, in a case where the power transmission apparatus 100 uses the A-ping and detects that an object has been placed, then in step F501, the power transmission apparatus 100 measures a Q-value (quality factor) of the power transmission coil 209. After the measurement of the Q-value ends, in step F502, the power transmission apparatus 100 starts transmission of a digital ping (hereinafter, will be referred to as a "D-ping"). The D-ping is power for starting the control unit 301 of the power receiving apparatus 101 and is power larger than the A-ping. Then, the power transmission apparatus 100 continues to transmit power equal to or larger than the D-ping since the transmission of the D-ping has been started in step F502 until an end power transfer (EPT) packet as a request for a power transmission stop is received from the power receiving apparatus 101 in step F522. In step F503, in a case where the control unit 301 of the power receiving apparatus 101 receives the D-ping and starts up, the control unit 301 transmits a signal strength packet, which is data containing a voltage value of the received D-ping, to the power transmission apparatus 100. In response to receipt of the signal strength packet from the power receiving apparatus 101 that has received the D-ping, the power transmission apparatus 100 recognizes that an object detected in the selection phase is a power receiving apparatus. In a case where the power transmission apparatus 100 receives the signal strength packet, the power transmission apparatus 100 transitions to the I & C phase.

In step F504 in the I & C phase, the power receiving apparatus 101 transmits data containing version information of a WPC standard of the power receiving apparatus 101 and an ID containing device identification information. In step F505, the power receiving apparatus 101 transmits, to the power transmission apparatus 100, a configuration packet containing information indicating a maximum value of power to a load (the charging unit 306) from the power receiving unit 302. In response to receipt of the ID and the configuration packet, the power transmission apparatus 100 determines whether a version of the power receiving apparatus 101 is a WPC standard version supported by the WPC standard of the power transmission apparatus 100, and transmits an acknowledgement (ACK). More specifically, in a case where the power transmission apparatus 100 determines that the power receiving apparatus 101 supports an expanded protocol (including processing in the negotiation phase to be described below) of the WPC standard v1.2 or a newer version, then in step F506, the power transmission apparatus 100 transmits an ACK as a response. In a case where the power receiving apparatus 101 receives the ACK, the power receiving apparatus 101 transitions to the negotiation phase for negotiation of power to be transmitted and received.

In step F507 in the negotiation phase, the power receiving apparatus 101 transmits foreign object detection (FOD) status data to the power transmission apparatus 100. In the present exemplary embodiment, the FOD status data will be represented as FOD (Q). The power transmission apparatus 100 performs foreign object detection based on a Q-value stored in the received FOD (Q) and a Q-value measured in the Q-value measurement, and then in step F508, transmits an ACK indicating a determination that a foreign object is highly possibly absent, to the power receiving apparatus 101.

In response to receipt of the ACK, in step F535, the power receiving apparatus 101 transmits a general request (capability) packet, which is data for inquiring about the capability of the power transmission apparatus 100 and is one of general requests defined in the WPC standard. Hereinafter, the general request (capability) packet will be represented as a GRQ (CAP) packet. In response to receipt of the GRQ (CAP) packet, in step F536, the power transmission apparatus 100 transmits a capability packet (hereinafter, will be referred to as "CAP") containing capability information of the power transmission apparatus 100.

The power receiving apparatus 101 performs negotiation of guaranteed power (hereinafter, will be referred to as "GP"), which is a maximum value of power requested to be received. Specifically, the guaranteed power indicates an amount of power usable by the power receiving apparatus 101 that has been agreed in negotiation with the power transmission apparatus 100. In other words, the GP is a maximum value of power that is usable in power supply to the load of the power receiving apparatus 101 (power consumed by the charging unit 306). In step F509, the negotiation is performed by transmitting a packet containing a value of guaranteed power requested by the power receiving apparatus 101, among specific request packets defined in the WPC standard, to the power transmission apparatus 100. In the present exemplary embodiment, the data will be represented as an SRQ (GP) packet.

The power transmission apparatus 100 responds to the SRQ (GP) packet in consideration of a power transmission capability of the power transmission apparatus 100. In a case where the power transmission apparatus 100 has determined that the guaranteed power can be accepted, then in step F510, the power transmission apparatus 100 transmits an ACK indicating that the request has been accepted. After the negotiation of a plurality of parameters including the guaranteed power ends, in step F511, the power receiving apparatus 101 transmits an SRQ (EN) packet requesting an end of negotiation (end negotiation), among specific requests, to the power transmission apparatus 100. In step F512, the power transmission apparatus 100 transmits an ACK in response to the SRQ (EN) packet, ends the negotiation, and transitions to the calibration phase for creating a reference for foreign object detection that is based on a power loss method. The foreign object detection is processing of determining whether an object (hereinafter, will be referred to as a foreign object) different from the power receiving apparatus 101 exists within the power-transmissible range of the power transmission apparatus 100 or a foreign object is possibly exists.

In the calibration phase, the power receiving apparatus 101 notifies the power transmission apparatus 100 of a received power value R1 of power received when the power receiving apparatus 101 has received the D-Ping, in a state in which the power receiving unit 302 and a load (the battery 307) are not connected. In step F513, the power receiving apparatus 101 transmits a received power packet (mode 1) (hereinafter, will be referred to as "PR1") containing the received power value R1, to the power transmission apparatus 100. In response to receipt of the RP1, in step F514, the power transmission apparatus 100 transmits an ACK to the power receiving apparatus 101. In this process, the power transmission apparatus 100 measures a transmitted power value T1 of the power transmission apparatus 100 and calculates a difference Δ1 between the transmitted power value T1 and the received power value R1, which corresponds to a power loss. After the power receiving apparatus 101 has received the ACK, the power receiving apparatus 101 transmits a control error packet (hereinafter, will be represented as "CE") for requesting the power transmission apparatus 100 to increase or decrease a voltage to be received by the power receiving apparatus 101, to the power transmission apparatus 100 in a state in which the power receiving unit 302 and the load are connected. A sign and a numerical value are stored in the CE. A plus sign of the numerical value stored in the CE means that a voltage to be transmitted to the power receiving apparatus 101 is requested to be increased, and a minus sign of the numerical value stored in the CE means that a voltage to be transmitted to the power receiving apparatus 101 is requested to be decreased. In a case of a numerical value being zero, a voltage to be transmitted to the power receiving apparatus 101 is requested to be maintained. In this example, in step F515, the power receiving apparatus 101 transmits CE (+) requesting that a voltage to be transmitted to the power receiving apparatus 101 is increased, to the power transmission apparatus 100.

In response to receipt of the CE (+), in step F516, the power transmission apparatus 100 changes a setting value of a power transmission circuit to increase a transmitting voltage. In response to received power raised in response to the CE (+), the power receiving apparatus 101 supplies the received power to the charging unit 306 serving as a load, and then in step F517, transmits a received power packet (mode 2) (hereinafter, will be referred to as "RP2") to the power transmission apparatus 100. The RP2 contains a received power value R2 of power received in a state in which the power receiving apparatus 101 has supplied an output of the power receiving unit 302 to the load (the battery 307).

In response to the RP2, in step F518, the power transmission apparatus 100 transmits an ACK to the power receiving apparatus 101. In this process, the power transmission apparatus 100 measures a transmitted power value T2 of the power transmission apparatus 100 and calculates a difference Δ2 between the transmitted power value T2 and the received power value R2, which corresponds to a power loss. With reference to the power loss Δ1 obtained when the power receiving unit 302 and the load are not connected and power consumption of the load is 0, and the power loss Δ2 obtained when the power receiving unit 302 and the load are connected and power consumption of the load is not 0, the power transmission apparatus 100 performs foreign object detection that is based on the power losses. Specifically, the power transmission apparatus 100 predicts a power loss at a certain received power value in a state in which no foreign object exists, from the power losses Δ1 and Δ2, and performs foreign object detection based on a received power value and a transmitted power value that have been actually received. In a case where the power transmission apparatus 100 transmits an ACK in response to the RP2, the power transmission apparatus 100 transitions to the power transfer phase.

In the power transfer phase, the power transmission apparatus 100 transmits power with which the power receiving apparatus 101 receives up to 15 watt which has been negotiated and determined in the negotiation phase. In steps F519 and F520, the power receiving apparatus 101 periodically transmits a received power packet (mode 0) (hereinafter, will be referred to as "RP0") containing CE and a current received power value, to the power transmission apparatus 100. In response to receipt of the RP0 from the power receiving apparatus 101, the power transmission apparatus 100 predicts a power loss at a certain received power from the power losses Δ1 and Δ2, and performs foreign object detection. In a case where the power transmission apparatus 100 has determined that no foreign object highly possibly exists, as a result of the foreign object detection, then in step F521, the power transmission apparatus 100 transmits an ACK to the power receiving apparatus 101. In a case where the power transmission apparatus 100 has determined that a foreign object highly possibly exists, the power transmission apparatus 100 transmits a non-acknowledgement (NAK) to the power receiving apparatus 101.

After completion of charging the battery 307, in step F522, the power receiving apparatus 101 transmits an EPT packet for requesting a power transmission stop, to the power transmission apparatus 100. The above-described flow is a procedure of control that is performed between the power transmission apparatus 100 and the power receiving apparatus 101 in compliant with the WPC standard v1.2.3.

Figure 6:
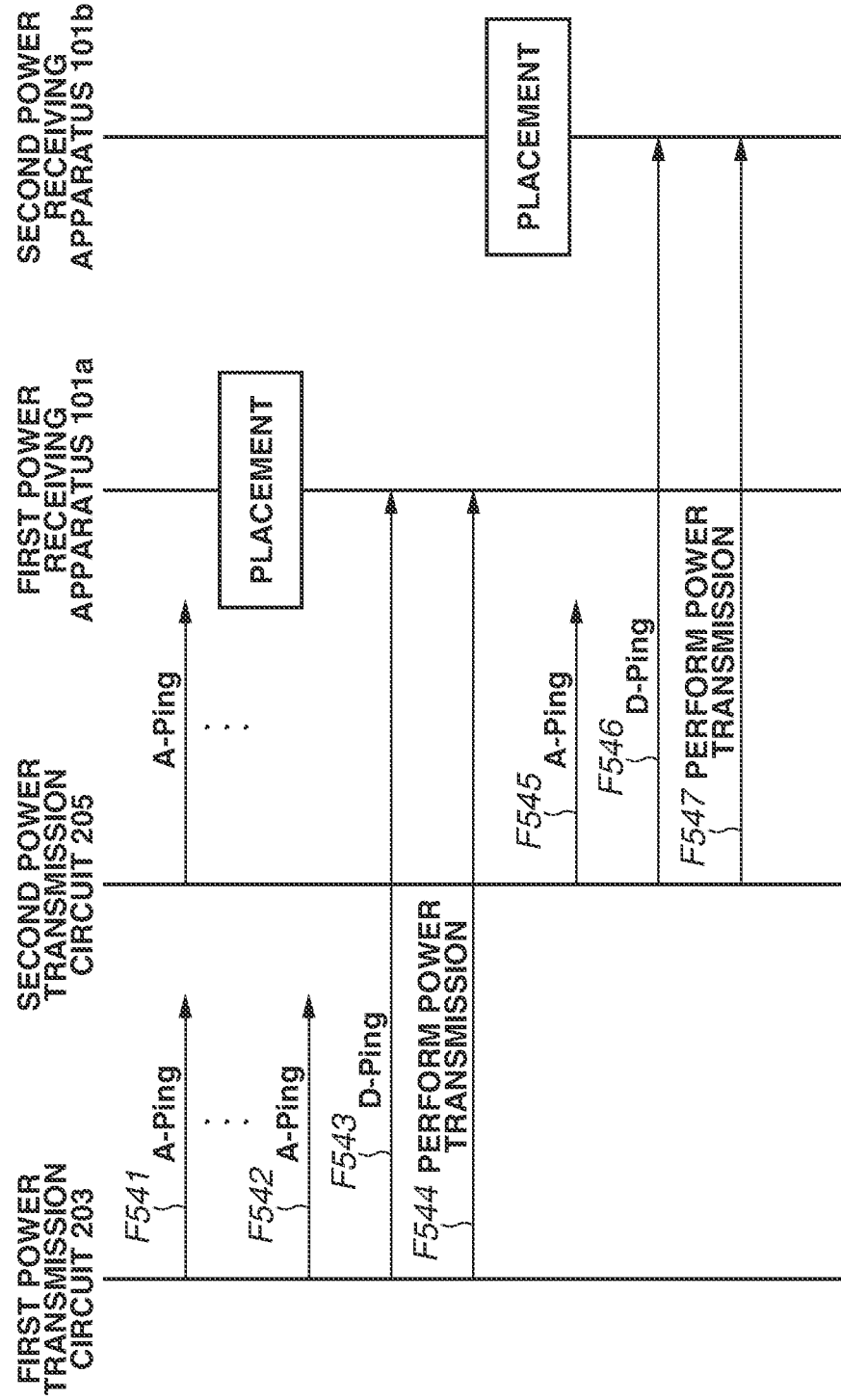
FIG. 6 is a diagram illustrating a procedure that is performed by a power transmission apparatus including a plurality of power transmission coils.

Next, an example of control that is performed when the power transmission apparatus 100 including a plurality of power transmission coils 209 performs power transmission based on the WPC standard will be described with reference to FIG. 6. The first power transmission circuit 203 and the second power transmission circuit 205 included in the power transmission apparatus 100 according to the present exemplary embodiment can each perform the processing illustrated in FIG. 5. While the illustration of several processes is omitted in FIG. 6 for the sake of simplification of description, processing similar to the processing illustrated in FIG. 5 is executed.

In step F541, the first power transmission circuit 203 and the second power transmission circuit 205 each intermittently transmit an A-ping for detecting a power receiving apparatus placed within a power-transmissible range of the power transmission apparatus 100, using the power transmission coil 209 to which the corresponding power transmission circuit is connected. A control method of the A-ping according to the present exemplary embodiment will be described below. In this example, in steps F542 and F543, in a case where the first power receiving apparatus 101a is placed in close proximity to the power transmission coil 209 to which the first power transmission circuit 203 is connected, the first power transmission circuit 203 transmits a D-ping to the first power receiving apparatus 101a. The first power transmission circuit 203 performs the above-described control communication, transitions to the power transfer phase, and then in step F544, transmits power for charging to the first power receiving apparatus 101a. In this process, the second power transmission circuit 205 is continuously transmitting an A-ping in step F545.

Then, in a case where the second power receiving apparatus 101b is placed in close proximity to the power transmission coil 209 to which the second power transmission circuit 205 is connected, in step F546, the second power transmission circuit 205 transmits a D-Ping to the second power receiving apparatus 101b. The second power transmission circuit 205 performs the above-described control communication, transitions to the power transfer phase, and then in step F547, transmits power for charging to the second power receiving apparatus 101b. By the above-described processing, the power transmission apparatus 100 can simultaneously charge a plurality of power receiving apparatuses.

[Processing in Power Transmission Apparatus]

An issue that is addressed in the present exemplary embodiment will be described. In a case where the first power transmission circuit 203 and the second power transmission circuit 205 individually perform control communication and power transmission, power transmitted by a power transmission coil connected to one power transmission circuit is sometimes superimposed on power from a power transmission coil connected to the other power transmission circuit. In the present exemplary embodiment, this phenomenon will be represented as interference. The definitions of "interfere" and "not interfere" will be described. A case where two power transmission coils do "not interfere" with each other includes the following cases, which are the cases including a case where a voltage/current amplitude variation or frequency variation of a modulation signal transmitted and received by one of two power transmission coils is not observed in the other power transmission coil, and a case where a level of observed voltage/current amplitude variation or frequency variation is equal to or smaller than a predetermined value and the observed voltage/current amplitude variation or frequency variation does not affect demodulation performance when a communication unit demodulates a modulation signal of the other power transmission coil. A case where two power transmission coils "interfere" with each other includes the following cases, which are the cases including a case where a voltage/current amplitude variation or frequency variation of a modulation signal transmitted and received by one of two power transmission coils is observed in the other power transmission coil, or a case where a level of observed voltage/current amplitude variation or frequency variation is larger than a predetermined value, and the observed voltage/current amplitude variation or frequency variation affects demodulation performance when a communication unit demodulates a modulation signal of the other power transmission coil.

The existence or non-existence of interference can be defined based on a high-frequency voltage or a high-frequency current applied to one power transmission coil of electromagnetically-coupled (i.e., coupling coefficient is not zero) two power transmission coils. In other words, in a case where a variation in high-frequency voltage or high-frequency current applied to one power transmission coil is not induced to the other power transmission coil or a level of induced variation is equal to or smaller than a predetermined value, it can be determined that the power transmission coils are in "not interfering with each other", and if not, the power transmission coils are in "interfering with each other".

The above-described interference can occur in a case where the first power transmission circuit 203 and the second power transmission circuit 205 simultaneously perform control communication or power transmission, for example. The occurrence of interference may be prevented by, for example, a method of differentiating timings at which the first power transmission circuit 203 and the second power transmission circuit 205 perform control communication or power transmission. Hereinafter, a method of object detection that is performed by outputting A-pings using a plurality of power transmission coils and prevents the occurrence of interference will be described. According to this method, A-pings are simultaneously output from power transmission coils disposed at different positions. It is therefore possible to efficiently detect a foreign object in a short time.

A degree of the interference varies in accordance with a positional relationship between two power transmission coils. In the present exemplary embodiment, in a case where two power transmission coils are separated by a predetermined distance D or more, the two power transmission coils are determined as the power transmission coils not interfering with each other. A description will be given of a case where the distance 412 between the power transmission coils 400 and 411 that is illustrated in FIG. 4D is set to the predetermined distance D. In this case, it can be determined that the power transmission coils 400 and 411 are the power transmission coils not interfering with each other. In addition, the power transmission coils 400 and 410 overlap each other and are not separated by the predetermined distance D or more, and the power transmission coils 401 and 410 overlap each other and are not separated by the predetermined distance D or more. Thus, it can be determined that the power transmission coils 400 and 410, and the power transmission coils 401 and 410, are power transmission coils interfering with each other.

The predetermined distance D is preset by measuring a distance between power transmission coils at which interference does not occur, for example. For example, a voltage or a current is applied to a predetermined power transmission coil of a plurality of power transmission coils, and a variation in voltage or current in the other power transmission coil at the time is measured. In the measurement, a power transmission coil in which a variation is not caused or a variation is equal to or smaller than a predetermined amount is identified, and a distance between the identified power transmission coil and the predetermined power transmission coil is measured, whereby the predetermined distance D at which interference does not occur is acquired. Alternatively, for example, an amplitude or a frequency of a voltage or a current applied to a predetermined power transmission coil of a plurality of power transmission coils is varied, and a variation in amplitude or frequency of a voltage or a current in the other power transmission coil at the time is measured. In the measurement, a power transmission coil in which a variation is not caused, or a variation is equal to or smaller than a predetermined amount is identified, and a distance between the identified power transmission coil and the predetermined power transmission coil is measured, whereby the predetermined distance D at which interference does not occur is acquired. The predetermined value and the predetermined distance D that are to be used for the determination of the existence or nonexistence of interference can be defined in accordance with the WPC standard.

The predetermined distance D at which interference does not occur can vary in accordance with the definition of a distance between power transmission coils. For example, the predetermined distance D can be a value varying between a case where a distance between power transmission coils is a distance between reference points (e.g., centroids, etc.) of the power transmission coils, and a case where a distance between power transmission coils is the shortest distance between the power transmission coils. In addition, power transmission coils are not limited to power transmission coils arranged on the two-dimensional plane as illustrated in FIGS. 4A to 4E, and can also include power transmission coils arranged in a three-dimensional space (e.g., in the height direction). In the present exemplary embodiment, under any condition, the predetermined distance D at which interference does not occur can be acquired by the similar method, and control to be described below can be executed.

As described above, simultaneous power transmission from power transmission coils in a predetermined positional relationship may cause the interference between the power transmission, which may affect power transmission or control communication of the power transmission coils. For this reason, when selecting power transmission coils to be connected to the first power transmission circuit 203 and the second power transmission circuit 205, the power transmission apparatus 100 according to the present exemplary embodiment operates to select power transmission coils that are at positions separated by the predetermined distance D or more and do not interfere with each other. With this configuration, even in power transmission that uses a plurality of power transmission coils, it is possible to perform appropriate power transmission.

In the present disclosure, a method of not determining a specific predetermined distance D can also be used. Specifically, a power transmission coil in which interference is caused by power transmission to a certain power transmission coil is identified. More specifically, in accordance with power transmission to a certain power transmission coil, a power transmission coil interfering with the certain power transmission coil or a power transmission coil not interfering with the certain power transmission coil is preliminarily identified, and the identified result is be held. In a case where a certain power transmission coil is selected, a power transmission coil identified as a power transmission coil not interfering with the certain power transmission coil is selected based on the identification result. The power transmission apparatus 100 operates using these selected power transmission coils.

Figure 7:
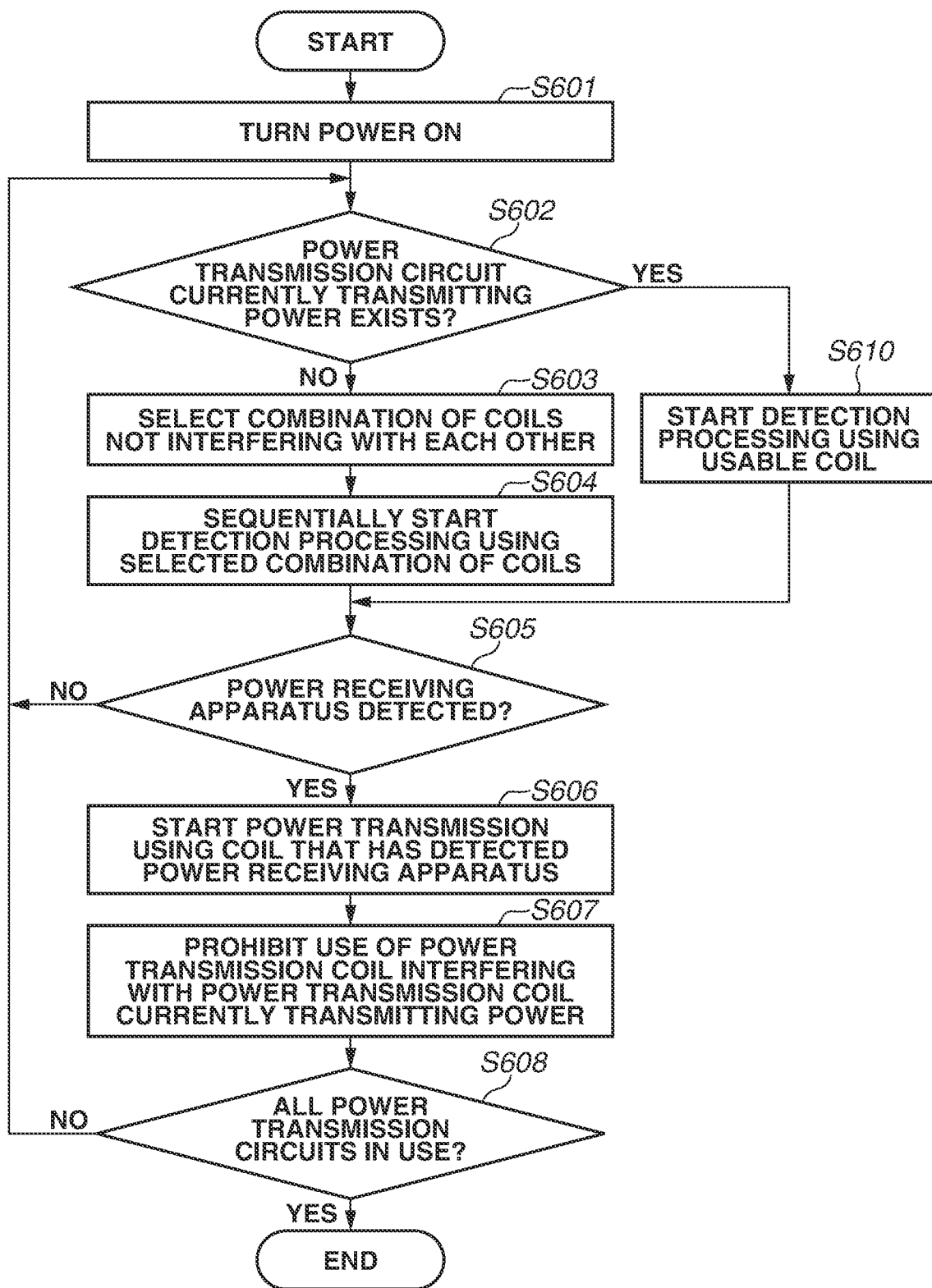
FIG. 7 is a flowchart illustrating processing that is performed by a power transmission apparatus according to a first exemplary embodiment.
Figure 8:
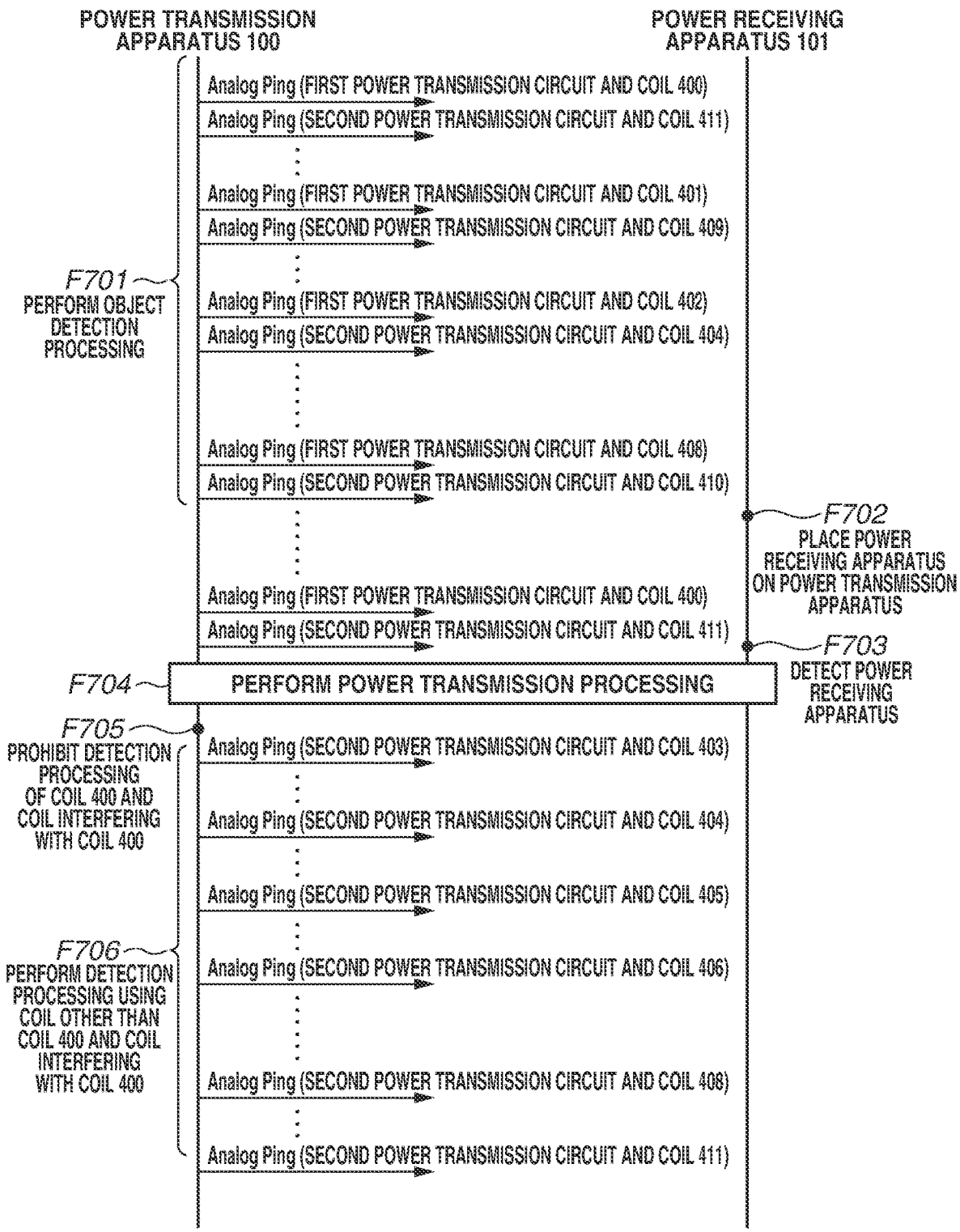
FIG. 8 is a sequence diagram illustrating processing that is performed by the power transmission apparatus and the power receiving apparatus according to the first exemplary embodiment.

FIG. 7 is a flowchart illustrating processing that is executed by the power transmission apparatus 100 according to the present exemplary embodiment. FIG. 8 is a sequence diagram illustrating processing that is executed by the power transmission apparatus 100 according to the present exemplary embodiment. The processing in the flowchart illustrated in FIG. 7 and the sequence diagram illustrated in FIG. 8 can be implemented by the control unit 201 of the power transmission apparatus 100 executing a control program stored in the memory 207 and executing information calculation and processing, and control of each hardware component.

In step S601, in a case where the control unit 201 turns the power of the power transmission apparatus 100 ON, the control unit 201 performs processing of selecting power transmission coils to be connected to the first power transmission circuit 203 and the second power transmission circuit 205 from among the power transmission coil unit 210. The processing varies based on whether the power transmission apparatus 100 already currently performs power transmission processing for charging. Thus, in step S602, the control unit 201 determines whether the power transmission apparatus 100 already currently performs power transmission processing for charging. In this description, because it is right after the power of the power transmission apparatus 100 has been turned ON, the control unit 201 determines that power transmission processing is not performed (NO in step S602), and the processing proceeds to step S603. The control unit 201 selects power transmission coils not interfering with each other even in a case where the power transmission coils are simultaneously used by the first power transmission circuit 203 and the second power transmission circuit 205.

A selection method of power transmission coils not interfering with each other will now be described. As described with reference to FIG. 4D, two power transmission coils separated by the predetermined distance D or more does not interfere with each other. The control unit 201 determines a combination of power transmission coils separated from each other by the predetermined distance D or more, like the power transmission coils 400 and 411 illustrated in FIG. 4D. As an example, the control unit 201 determines, as combinations of the power transmission coils not interfering with each other in the power transmission coil unit 210 illustrated in FIG. 4C, the power transmission coils 400 and 411, the power transmission coils 401 and 409, the power transmission coils 402 and 404, the power transmission coils 403 and 407, the power transmission coils 405 and 406, and the power transmission coils 408 and 410. These combinations are merely examples, and a different combination can be determined. In step S603, in accordance with the combinations determined by the control unit 201, the selection unit 208 connects two power transmission coils in a positional relationship not causing interference, to the first power transmission circuit 203 and the second power transmission circuit 205, respectively.

In step S604, the power transmission apparatus 100 sequentially starts the detection processing using the selected combination of power transmission coils, then in step S605, the power transmission apparatus 100 waits until a power receiving apparatus is placed on the power transmission apparatus 100. The control of an A-ping will be described in detail with reference to FIG. 8. Based on the determined combination of power transmission coils, the selection unit 208 first connects the first power transmission circuit 203 and the power transmission coil 400, and the second power transmission circuit 205 and the power transmission coil 411. In step F701, by simultaneously output A-pings from the power transmission coils 400 and 411, the control unit 201 performs object detection processing. Because the power transmission coils 400 and 411 are in a positional relationship not causing interference with each other, even in a case where control is performed in such a manner that the first power transmission circuit 203 and the second power transmission circuit 205 simultaneously transmit A-pings, interference between the power transmission coils 400 and 411 do not occur. Timings or periods at which or during which A-pings are output from the two power transmission coils can be identical, or can be different. It is sufficient that periods during which A-pings are output from the two power transmission coils overlap in at least a partial period. To prevent the occurrence of interference, a method of preventing overlap between periods during which A-pings are output from a plurality of power transmission coils can also be used.

In a case where no power receiving apparatus has been detected, the selection unit 208 secondly connects the first power transmission circuit 203 and the power transmission coil 401, and the second power transmission circuit 205 and the power transmission coil 409, and performs detection processing of a power receiving apparatus. In this manner, until a power receiving apparatus is detected, the power transmission apparatus 100 connects the first power transmission circuit 203 and the second power transmission circuit 205 with power transmission coils based on the determined combination of power transmission coils and performs the object detection processing.

In step F702, in a case where a power receiving apparatus is placed on the power transmission apparatus 100, a change in voltage or current in the power transmission coil 400 of the power transmission apparatus 100 that currently transmits an A-ping at the time point is detected. Then, the power transmission apparatus 100 transmits a D-ping in the above-described ping phase. Then, through communication in the ping phase, the power transmission apparatus 100 identifies that the detected object is the power receiving apparatus 101. In this manner, in step F703, the power receiving apparatus 101 is detected.

The description will return to FIG. 7. In a case where the control unit 201 of the power transmission apparatus 100 detects that the power receiving apparatus 101 has been placed (YES in step S605), the processing proceeds to step S606. In step S606, the first power transmission circuit 203 executes power transmission processing through a plurality of phases defined in the WPC standard. In this case, the power transmission apparatus 100 has detected the placement of the power receiving apparatus 101 by using the power transmission coil 400 connected to the first power transmission circuit 203. The power transmission apparatus 100 performs power transmission for charging, using the power transmission coil 400 that has detected the power receiving apparatus 101. The control unit 201 prohibits the use of a power transmission coil that interferes with a power transmission coil, i.e., the power transmission coil 400 in this example, used for power transmission processing in the power transmission coil unit 210. Specifically, in FIG. 4C, power transmission coils not separated from the power transmission coil 400 by the predetermined distance D or more are the power transmission coils 401, 402, 409, and 410. Accordingly, in step S607, the control unit 201 prohibits the use of the power transmission coils 401, 402, 409, and 410 during use of the power transmission coil 400.

On the other hand, because the second power transmission circuit 205 has not detected the placement of a power receiving apparatus (NO in step S605), the processing returns to step S602. by performing the processing in step S602 and subsequent steps again, the second power transmission circuit 205 selects power transmission coils from the power transmission coil unit 210 and detects the placement of a power receiving apparatus. Because the first power transmission circuit 203 is already executing power transmission processing (YES in step S602), the processing proceeds to step S610. In step S610, the second power transmission circuit 205 selects a power transmission coil other than the power transmission coils of which the use is prohibited, from the power transmission coil unit 210, and performs detection processing until the placement of a power receiving apparatus is detected. In other words, the second power transmission circuit 205 detects a newly-placed power receiving apparatus using a power transmission coil having a positional relationship not causing interference with the power transmission coil 400 currently used for power transmission for charging by the first power transmission circuit 203.

Detailed description will be given with reference to FIG. 8. In a case where the power transmission apparatus 100 detects that the power receiving apparatus 101 has been placed, using the power transmission coil 400 in step F703, then in step F704, the power transmission apparatus 100 starts power transmission for charging using the power transmission coil 400. In step F705, the power transmission apparatus 100 prohibits the use of a power transmission coil that interferes with the power transmission coil 400. The power transmission apparatus 100 sequentially connects the second power transmission circuit 205 with power transmission coils other than the power transmission coil of which the use is prohibited, and then in step F706, transmits an A-ping for detecting a power receiving apparatus.

The description will return to FIG. 7. In a case where the second power transmission circuit 205 has detected a power receiving apparatus, in step S606, the control unit 201 executes power transmission processing through a plurality of phases defined in the above-described WPC standard. In a case where all power transmission circuits are performing power transmission for charging (YES in step S608), the power transmission apparatus 100 ends control processing for power transmission. A power transmission circuit that has ended power transmission processing by an EPT packet received from a power receiving apparatus executes the processing in step S602 and subsequent steps again, and performs detection of a new power receiving apparatus and power transmission. The processing illustrated in FIG. 7 is repeatedly performed until the power of the power transmission apparatus 100 is turned OFF.

As described above, the power transmission apparatus 100 according to the present exemplary embodiment performs control in such a manner that A-pings are not simultaneously output from two power transmission coils arranged at positions closer than positions separated from each other by a predetermined distance, among a plurality of power transmission coils. According to the present exemplary embodiment, even in a configuration in which a plurality of power transmission coils are tightly-arranged, it is possible to efficiently control power transmission and, at the same time, to prevent interference between power transmission coils. With this configuration, even in a case where a plurality of power receiving apparatuses are placed at certain locations on the power transmission apparatus 100, the power transmission apparatus 100 can appropriately perform detection and power transmission.

While, the description has been given of an example in which power transmission for charging is performed using a power transmission coil that has detected an object (power receiving apparatus), the present disclosure is not limited to this. To perform efficient power transmission, power transmission for charging can be performed using a power transmission coil different from a power transmission coil that has detected an object (power receiving apparatus). In this case, a power transmission circuit different from a power transmission circuit for charging transmits an A-ping using a power transmission coil not interfering with a power transmission coil that performs power transmission for charging. That is, a power transmission coil not interfering with a power transmission coil for power transmission for charging is identified, and an A-ping is transmitted using the identified power transmission coil.

While, in the present exemplary embodiment, an example in which the number of power transmission circuits is two has been described, the method described in the present exemplary embodiment can be applied also in a case where the number of power transmission circuits is three or more. For example, in a case where the power transmission apparatus 100 includes three power transmission circuits including a third power transmission circuit (not illustrated) in addition to the first power transmission circuit 203 and the second power transmission circuit 205, the power transmission apparatus 100 performs the following processing. More specifically, in a case where the control unit 201 of the power transmission apparatus 100 outputs signals for object detection using the power transmission circuits, three power transmission coils 209 arranged at positions separated from each other by the predetermined distance D or more are used as three power transmission coils 209 to be connected to the respective power transmission circuits. In the example of the power transmission coil unit 210 illustrated in FIG. 4C, for example, the power transmission coils 400, 403, and 411 are selected as the three power transmission coils. Because the three power transmission coils are separated from each other by the predetermined distance D or more, even in a case where A-pings are simultaneously transmitted, interference does not occur. Since the power transmission coils 209 to be connected to the respective power transmission circuits are thus selected, the power transmission apparatus 100 can prevent interference between the power transmission coils even in a case where A-pings are output from three power transmission coils 209. The same applies to a case where the number of power transmission circuits is four or more.

In the above-described first exemplary embodiment, power transmission capabilities of the first power transmission circuit 203 and the second power transmission circuit 205 can be the same, or can be different. In a second exemplary embodiment, control that is performed in a case where power transmission capabilities of a plurality of power transmission circuits included in a power transmission apparatus are different will be described. In a case where power is transmitted to a power receiving apparatus using a power transmission apparatus including a plurality of power transmission circuits with different power transmission capabilities, the following issue may arise. For example, in a case where a power receiving apparatus is placed on a power transmission apparatus, power transmission processing may be performed by a power transmission circuit that cannot transmit sufficient power receivable by the power receiving apparatus (power transmission circuit with a low power transmission capability). This causes such an issue that charging of the power receiving apparatus is not efficiently performed. In this manner, when power is transmitted to a power receiving apparatus using a power transmission apparatus including power transmission circuits with different power transmission capabilities, appropriate power transmission sometimes fails to be performed.

In the present exemplary embodiment, the description will be given of a method that enables sufficient power to be supplied to a power receiving apparatus, by determining a power transmission circuit to be used for power transmission, based on power transmission capabilities of power transmission circuits and a power receiving capability of the power receiving apparatus. In the present exemplary embodiment, as for configurations similar to those in the first exemplary embodiment, the same names and the same reference signs are used.

[Processing in Power Transmission Apparatus]

Hereinafter, processing to be executed by the power transmission apparatus 100 will be described with reference to FIGS. 9A, 9B, and 10. The processing in FIG. 9A is similar to the processing illustrated in FIG. 5 but different in that power transmission circuit switching processing to be described in the present exemplary embodiment is added. In response to acquisition of a configuration packet from the power receiving apparatus 101 in step F505, the power transmission apparatus 100 acquires a power receiving capability of the power receiving apparatus 101 from the acquired configuration packet. The power receiving capability indicates power receivable by the power receiving apparatus 101 that is based on a maximum value of power to the load (the charging unit 306) from the power receiving unit 302 of the power receiving apparatus 101. Specifically, the power receiving capability indicates power equivalent to maximum power in the WPC standard. In step F826, the power transmission apparatus 100 executes switching processing based on maximum power (power transmission capability) transmissible by the power transmission apparatus 100 for charging the power receiving apparatus 101 and the acquired power receiving capability of the power receiving apparatus 101. The switching processing can be executed before transition to the power transfer phase.

Figure 10:
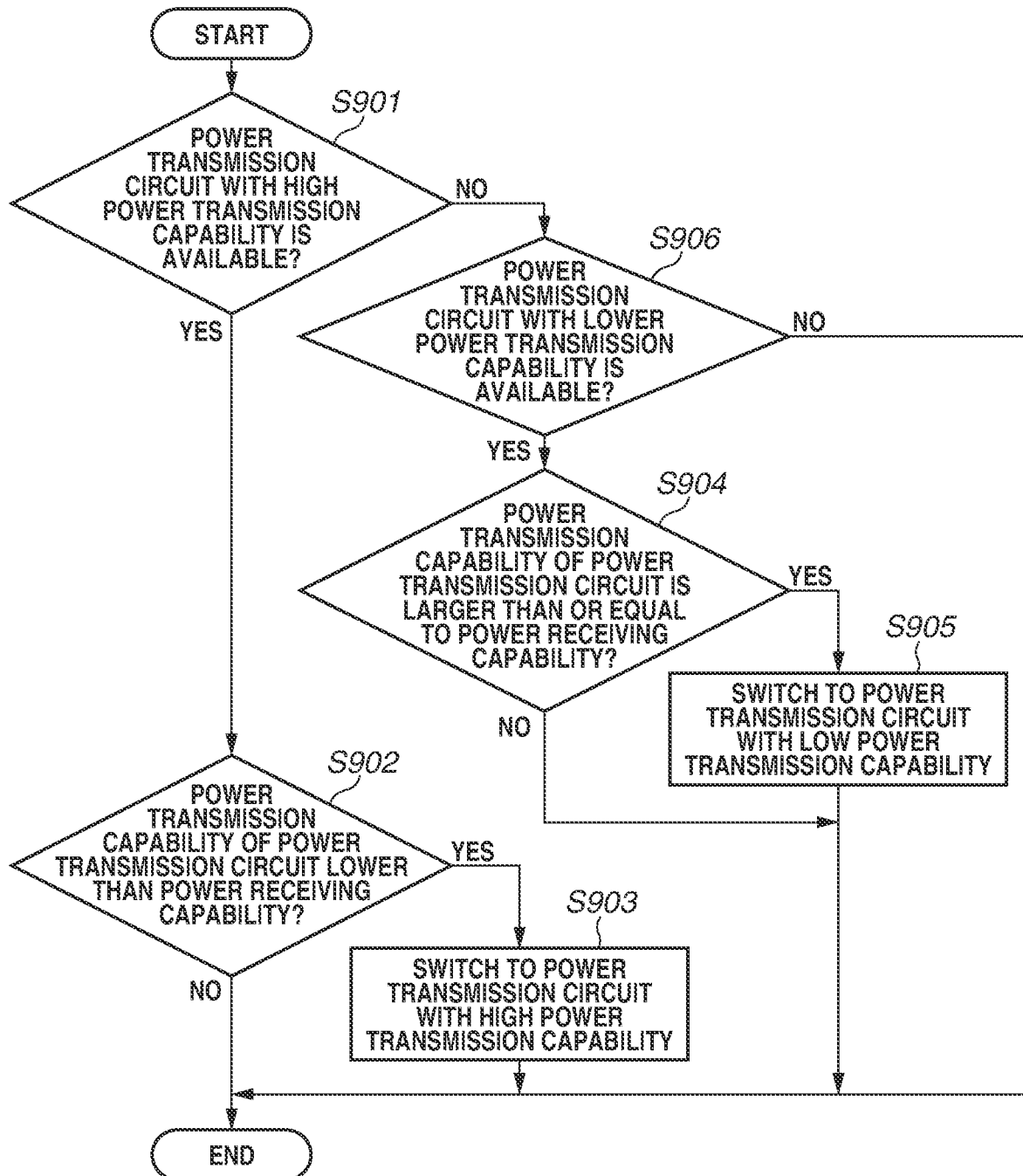
FIG. 10 is a flowchart illustrating processing that is performed by the power transmission apparatus according to the second exemplary embodiment.

FIG. 10 illustrates a processing procedure of power transmission circuit switching processing that is executed by the power transmission apparatus 100 according to the present exemplary embodiment. The processing illustrated in FIG. 10 is performed in step F826 in FIG. 9A. A description will be given of processing after, the power transmission apparatus 100 has detected the power receiving apparatus 101 using the first power transmission circuit 203 and acquired a configuration packet from the power receiving apparatus 101. First of all, in step S901, the power transmission apparatus 100 determines whether a power transmission circuit with a power transmission capability higher than that of the first power transmission circuit 203 currently performing control communication with the power receiving apparatus 101 is available for power transmission. That is, the power transmission apparatus 100 determines whether a power transmission circuit that has a power transmission capability higher than that of the first power transmission circuit 203 and does not currently perform power transmission to a different power receiving apparatus exists. In this example, the second power transmission circuit 205 has a power transmission capability higher than that of the first power transmission circuit 203 and does not currently perform power transmission. In a case where a power transmission circuit currently performing control communication with the power receiving apparatus 101 is the second power transmission circuit 205, because there is no power transmission circuit with a power transmission capability higher than that of the second power transmission circuit 205, in the determination in step S901, it is determined that there is no power transmission circuit with a higher power transmission capability available for power transmission (NO in step S901).

In a case where there is an applicable power transmission circuit available for power transmission (YES in step S901), the processing proceeds to step S902. In step S902, the power transmission apparatus 100 determines whether a power transmission capability of a power transmission circuit currently performing control communication with the power receiving apparatus 101 is lower than a power receiving capability of the power receiving apparatus 101. In this example, in a case where the power transmission apparatus 100 cannot perform power transmission satisfying the maximum power contained in the configuration packet, it is determined that the power transmission capability is lower than the power receiving capability. In a case where the power transmission capability is lower than the power receiving capability (YES in step S902), the processing proceeds to step S903. In step S903, the power transmission apparatus 100 switches the first power transmission circuit 203 currently performing control communication with the power receiving apparatus 101, to a different power transmission circuit with a higher power transmission capability. In this step, the power transmission apparatus 100 switches, using the selection unit 208, connection of a power transmission coil that performs control communication with the power receiving apparatus 101, from the first power transmission circuit 203 to the second power transmission circuit 205. On the other hand, in a case where the power transmission capability is higher than the power receiving capability (NO in step S902), the processing ends.

A case where it is determined in step S901 that an applicable power transmission circuit does not exist (NO in step S901) will also be described. In a case where it is determined in step S901 that an applicable power transmission circuit is not available (NO in step S901), the processing proceeds to step S906. In step S906, the power transmission apparatus 100 determines whether a power transmission circuit with a lower power transmission capability is available, and determines whether the different power transmission circuit is available. In a case where a different transmission circuit with a lower power transmission capability is available (YES in step S906), the processing proceeds to step S904. On the other hand, in a case where a power transmission circuit with a lower power transmission capability is not available (NO in step S906), the power transmission apparatus 100 ends the processing without switching a power transmission circuit. In step S904, the power transmission apparatus 100 determines whether a power transmission capability of the power transmission circuit with a lower power transmission capability is larger than or equal to the power receiving capability of the power receiving apparatus 101. In other words, the power transmission apparatus 100 determines whether maximum power transmissible by the different power transmission circuit is larger than or equal to power receivable by the power receiving apparatus 101. In a case where the power transmission capability of the different power transmission circuit is larger than or equal to the power receiving capability (YES in step S904), the processing proceeds to step S905. In step S905, the power transmission apparatus 100 switches connection of the power transmission coil currently performing control communication with the power receiving apparatus 101, to a different power transmission circuit with a lower power transmission capability. In a case where the power transmission capability of the applicable power transmission circuit is lower than the power receiving capability (NO in step S904), the processing ends. With the above-described processing, it is possible to transmit sufficient power to the second power receiving apparatus in a case where a second power receiving apparatus is placed as described below, which results in effective utilization of a power transmission capability of the power transmission apparatus 100.

Processing that is executed by the power transmission apparatus 100 of the present exemplary embodiment will be described using a specific example. The description will be given of a method of supplying sufficient power to a power receiving apparatus 101 in a case where the first power receiving apparatus 101a with a power receiving capability of 60 w is placed on the power transmission apparatus 100 including the first power transmission circuit 203 with a power transmission capability of 15 w and the second power transmission circuit 205 with a power transmission capability of 60 w. The power transmission apparatus 100 transmits an A-ping via the first power transmission circuit 203 in step F500 of FIG. 9A. In a case where the first power receiving apparatus 101a is placed, the power transmission apparatus 100 and the first power receiving apparatus 101a execute the sequence of procedures from step F501 to step F506. In this example, in step F505, the power transmission apparatus 100 can recognize that a power receiving capability of the first power receiving apparatus 101a is 60 w, based on a value of maximum receivable power included in a configuration packet. Because the power transmission apparatus 100 is performing power transmission via the first power transmission circuit 203, the power transmission apparatus 100 cannot supply sufficient power to the first power receiving apparatus 101a. Thus, the power transmission apparatus 100 performs the power transmission circuit switching processing in step F826. Because it is determined in step S901 of FIG. 10 that the second power transmission circuit 205 with a power transmission capability of 60 w is available (YES in step S901), the power transmission apparatus 100 advances the processing to step S902. Subsequently, because it is determined in step S902 that a power transmission capability of the first power transmission circuit 203 currently transmitting power is lower than 60 w which is a power receiving capability of the first power receiving apparatus 101a, the power transmission apparatus 100 advances the processing to step S903. In step S903, the power transmission apparatus 100 stops power transmission and switches the first power transmission circuit 203 that transmits power to the first power receiving apparatus 101a, to the second power transmission circuit 205. The power transmission apparatus 100 performs the processing in step F507 and subsequent processing using the second power transmission circuit 205. Because the first power transmission circuit 203 does not perform communication with any power receiving apparatus, the first power transmission circuit 203 transmits an A-ping for detecting a new power receiving apparatus. In this manner, in the power transmission apparatus 100 including a plurality of power transmission circuits with different capabilities, it is possible to supply sufficient power to a power receiving apparatus by switching a power transmission circuit that transmits power to the power receiving apparatus, based on a power receiving capability of the power receiving apparatus and power transmission capabilities of the power transmission circuits.

FIG. 9B is a sequence diagram illustrating an operation of each of the first power transmission circuit 203 and second power transmission circuit 205, and processing that is executed in a case where the second power receiving apparatus 101b is placed. In the processing illustrated in FIG. 9B, processing similar to the processing illustrated in FIGS. 5 and 9A is assigned the same reference numeral, and the redundant description will be omitted. In FIG. 9B, in a case where the first power transmission circuit 203 detects the placement of the first power receiving apparatus 101a in step F542, then in step F543, the first power transmission circuit 203 transmits a D-ping to the first power receiving apparatus 101a, and performs control communication. In response to receipt of a configuration packet from the first power receiving apparatus 101a in step F505, the first power transmission circuit 203 transmits an ACK to the first power receiving apparatus 101a in step F506, and in step F826, performs the power transmission circuit switching processing illustrated in FIG. 10. Accordingly, the subsequent processing is performed by the second power transmission circuit 205.

The second power transmission circuit 205 performs the processing in step F507 of FIG. 9A and subsequent processing, and performs power transmission for charging to the first power receiving apparatus 101a in step F827. Because the power transmission apparatus 100 has already acquired information regarding the first power receiving apparatus 101a via the first power transmission circuit 203, the second power transmission circuit 205 can perform power transmission processing without acquiring information, such as a configuration packet again. Meanwhile, in step F828, the first power transmission circuit 203 transmits an A-ping to detect the placement of a new power receiving apparatus. In this example, in a case where the first power transmission circuit 203 detects that the second power receiving apparatus 101b has been newly placed, the first power transmission circuit 203 transmits a D-ping to the second power receiving apparatus 101b in step F829 and performs control communication to start power transmission for charging in step F830.

A specific example of the processing in FIG. 9B will now be described. A description will be given of a case where the first power receiving apparatus 101a with a power receiving capability of 5 w is placed on the power transmission apparatus 100 including the first power transmission circuit 203 with a power transmission capability of 15 w, and the second power transmission circuit 205 with a power transmission capability of 5 w, and then, a power receiving apparatus with a power receiving capability of 15 w is placed. The power transmission apparatus 100 transmits an A-ping via the first power transmission circuit 203 in step F541. In a case where the first power receiving apparatus 101a is placed, the power transmission apparatus 100 acquires a configuration packet from the first power receiving apparatus 101a in step F505, and thus can recognize that the power receiving capability of the first power receiving apparatus 101a is 5 w. The power transmission apparatus 100 performs the power transmission circuit switching processing in step F826 illustrated in FIG. 10. Because it is determined in step S901 that there is no power transmission circuit with a power transmission capability higher than that of the power transmission circuit currently performing control communication (NO in step S901), the power transmission apparatus 100 advances the processing to step S906. Because it is determined in step S906 that a power transmission circuit (the second power transmission circuit 205) with a power transmission capability lower than that of the power transmission circuit currently performing control communication is available (YES in step S906), the power transmission apparatus 100 advances the processing to step S904. Subsequently, because it is determined in step S904 that a power transmission capability of the applicable power transmission circuit is larger than or equal to a power receiving capability of the power receiving apparatus (YES in step S904), the power transmission apparatus 100 advances the processing to step S905. In step S905, the power transmission apparatus 100 switches a power transmission circuit that transmits power to the first power receiving apparatus 101a, to the second power transmission circuit 205.

The power transmission apparatus 100 transmits an A-ping via the first power transmission circuit 203 in step F828. After that, in a case where the second power receiving apparatus 101b with a power receiving capability of 15 w is placed, the power transmission apparatus 100 transmits a D-ping to the second power receiving apparatus 101b in step F829, and starts power transmission for charging in step F830. After step F828, the second power transmission circuit 205 acquires a configuration packet from the second power receiving apparatus 101b and similarly performs switching processing, which is not illustrated in FIG. 9B. Because the power transmission apparatus 100 recognizes that power transmission has already been performed by the first power transmission circuit 203, and an available power transmission circuit other than the second power transmission circuit 205 does not exist, the switching processing can be omitted.

By the above-described processing, the power transmission apparatus 100 can supply sufficient power to the second power receiving apparatus 101b which is newly placed. In this manner, in the power transmission apparatus 100 including a plurality of power transmission circuits with different capabilities, it is possible to supply sufficient power by switching a power transmission circuit that transmits power to a power receiving apparatus based on a power receiving capability of the power receiving apparatus and power transmission capabilities of the power transmission circuits. In the present exemplary embodiment, a power transmission circuit is switched using the selection unit 208 to not stop power transmission, but another method can be used. For example, the power transmission apparatus 100 transmits an EPT packet to the first power receiving apparatus 101a to stop power transmission, switches to a power transmission circuit by using the selection unit 208, and restarts the processing of transmitting an A-ping. With this configuration, a power transmission apparatus that cannot instantaneously switch a power transmission circuit is also able to supply sufficient power to a power receiving apparatus. In a case where the power transmission apparatus 100 has received a configuration packet from a power receiving apparatus, the power transmission apparatus 100 can perform the switching processing before transmitting an ACK as a response.

In the present exemplary embodiment, based on information included in a configuration packet acquired by the power transmission apparatus 100 in the I & C phase, the determination of switching a power transmission circuit is performed, but the configuration is not limited to this. The power transmission apparatus 100 can be configured to perform determination of switching a power transmission circuit based on information regarding GP that is acquired from the power receiving apparatus 101 in the negotiation phase, for example. The power transmission apparatus 100 compares power transmissible by a power transmission circuit and power indicated by GP contained in an SRQ (GP) packet acquired from the power receiving apparatus 101, and performs switching determination of a power transmission circuit. In a case where the power transmission apparatus 100 cannot transmits power equivalent to GP, the power transmission apparatus 100 switches a power transmission circuit to a power transmission circuit with a higher power transmission capability (YES in step S902 of FIG. 10, step S903). In a case where power transmissible by a power transmission circuit with a lower power transmission capability is larger than or equal to GP, the power transmission apparatus 100 switches a power transmission circuit to the power transmission circuit with a lower power transmission capability (YES in step S904 of FIG. 10, step S905). In this case, in the sequence in FIG. 9A, after the power transmission apparatus 100 has acquired an SRQ (GP) packet in step F511, or after the power transmission apparatus 100 has transmitted an ACK as a response to an SRQ (GP) packet in step F512, the power transmission apparatus 100 performs switching processing.

In a case where GP is changed during power transmission, the power transmission apparatus 100 can perform the power transmission circuit switching processing based on the changed GP. The power transmission apparatus 100 and the power receiving apparatus 101 can change GP by performing renegotiation. In this case, in a case where the power transmission apparatus 100 cannot transmit power equivalent to GP determined by the renegotiation, the power transmission apparatus 100 switches to a power transmission circuit with a higher power transmission capability. With this configuration, in a case where a power transmission circuit transmitting power cannot supply sufficient power, it is possible to supply sufficient power by switching the power transmission circuit. In a case where power transmissible by a power transmission circuit with a lower power transmission capability is larger than power equivalent to GP determined by the renegotiation, the power transmission apparatus 100 switches to the power transmission circuit with a lower power transmission capability. With this configuration, in a case where a new power receiving apparatus is placed, power can be transmitted to the new power receiving apparatus using a power transmission circuit with a higher power transmission capability. Consequently, the power transmission apparatus 100 can effectively utilize a power transmission capability of a power transmission circuit.

After a power transmission circuit to be used for power transmission has been determined in the I & C phase, the power transmission apparatus 100 can further perform the switching of a power transmission circuit based on information included in an SRQ packet acquired in the negotiation phase. The power transmission apparatus 100 can further perform the switching of a power transmission circuit based on information acquired in the renegotiation.

While the power receiving capability of the power receiving apparatus is indicated by a value of maximum receivable power or GP, the power receiving capability is not limited to this. For example, a power receiving capability of a power receiving apparatus can be acquired based on an identification number of the power receiving apparatus, information that can identify the type of the power receiving apparatus, and version information of the WPC, and the power transmission circuit switching processing can be performed based on the acquired power receiving capability. For example, a power transmission apparatus can identify whether the power receiving apparatus is a power receiving apparatus to which power has been transmitted in the past, based on an identification number of a power receiving apparatus, and determine a power transmission circuit to be used, in accordance with a past power transmission record. In addition, for example, a power transmission apparatus can identify the type of a power receiving apparatus, and perform switching processing of a power transmission apparatus in accordance with a case where the power receiving apparatus is a smartphone and a case where the power receiving apparatus is a PC. The above-described types of power receiving apparatuses are examples, and a power receiving apparatus of a type other than the above-described types can also be used. Switching processing can be performed based on an arbitrary number of information pieces among pieces of the above-described information acquired from a power receiving apparatus.

The method described in the present exemplary embodiment is applicable to a power transmission apparatus other than a power transmission apparatus including a plurality of power transmission coils as illustrated in FIGS. 2 and 4A to 4E. In other words, the present exemplary embodiment is applicable to a power transmission apparatus including a plurality of power transmission circuits with different power transmission capabilities. For example, the power transmission apparatus can be a power transmission apparatus in which a plurality of power transmission circuits with different power transmission capabilities can be connected to one power transmission coil. The method described in the present exemplary embodiment is applicable to a power transmission apparatus including a plurality of power transmission circuits including at least two power transmission circuits with different power transmission capabilities. For example, even in a case of a power transmission apparatus including two or more power transmission circuits, by applying the processing illustrated in FIG. 10, it is possible to perform power transmission using an appropriate power transmission circuit.

In a third exemplary embodiment, a case where a power transmission apparatus including a plurality of power transmission circuits detects a new power receiving apparatus during power transmission to one or more power receiving apparatuses will be described. In a case where an A-ping is constantly transmitted from each power transmission coil to detect a new power receiving apparatus during power transmission to a power receiving apparatus, radiated noise increases and a nearby device (ongoing power transmission) is negatively affected. As another issue, because A-pings are continuously transmitted from a plurality of power transmission coils, a power transmission apparatus consumes unnecessary power even during absence of a new power receiving apparatus. In this manner, in detection of a power receiving apparatus by a power transmission apparatus including a plurality of power transmission coils, a negative effect might be created between power transmission coils.

To solve the issue, a power transmission apparatus according to the present exemplary embodiment determines whether power is currently transmitted to a power receiving apparatus, and in a case where power is currently transmitted, the transmission of an A-ping from a power transmission coil is stopped, and object detection is performed based on a change in physical amount (physical parameter) in an object detection coil. Then, in a case where an object has been detected by the object detection coil, the transmission of an A-ping from each power transmission coil is performed. With this configuration, unnecessary A-ping transmission is suppressed, the placement of a new power receiving apparatus can be still detected and a negative effect on ongoing power transmission due to radiated noise and the like can also be reduced. Further, unnecessary power consumption can be suppressed.

Hereinafter, the exemplary embodiment will be described in detail with reference to the attached drawings. As for configurations similar to those in the above-described exemplary embodiments, the same names and the same reference signs are used.

[Configuration of Apparatus]

Figure 11A:
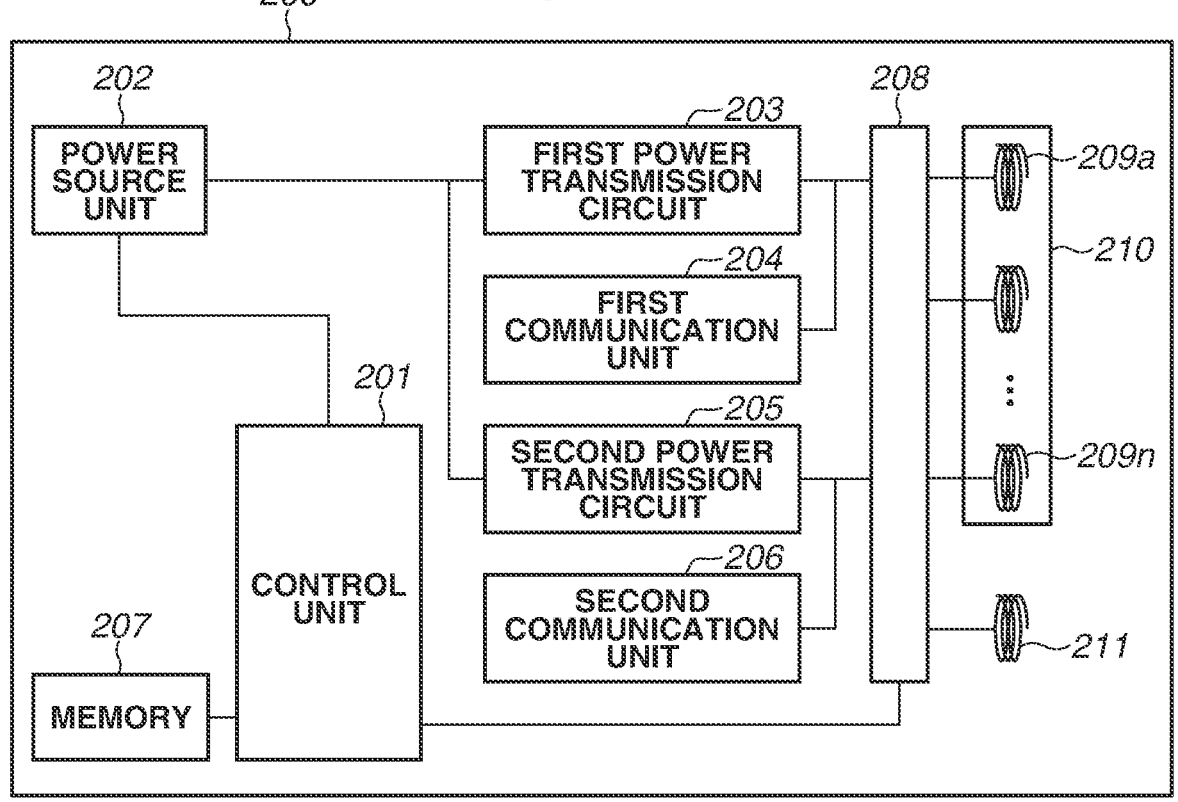
FIG. 11A is a diagram illustrating an example of a functional configuration of a power transmission apparatus.
Figure 11B:
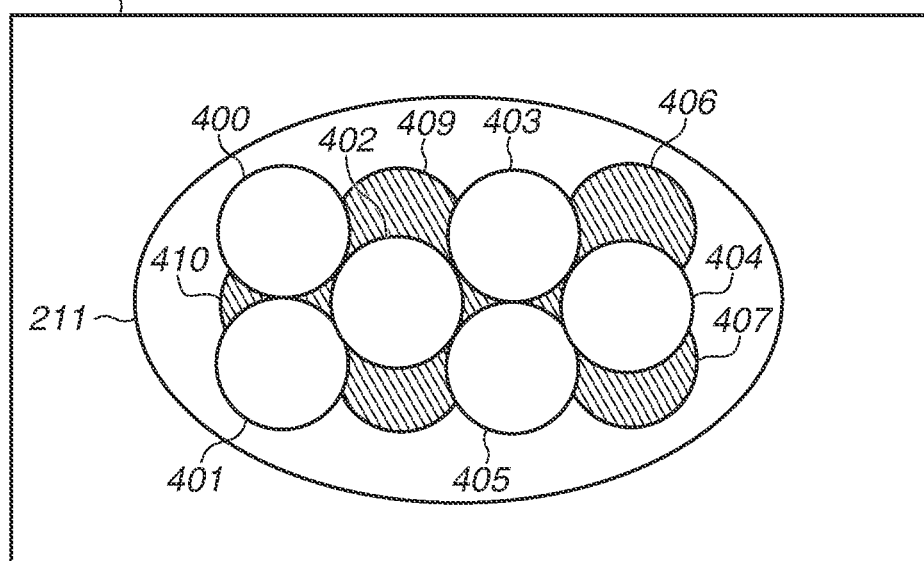
FIG. 11B is a diagram illustrating an example of a configuration of a power transmission coil unit included in the power transmission apparatus.

FIGS. 11A and 11B are diagrams illustrating a configuration of a power transmission apparatus 200 according to the present exemplary embodiment. As illustrated in FIG. 11A, the power transmission apparatus 200 further includes an object detection coil 211 configured to cover the entire power transmission range of the power transmission coil unit 210. FIG. 11B illustrates a configuration example of the object detection coil 211. The object detection coil 211 is a coil surrounding the power transmission coil unit 210 illustrated in FIG. 4C, for example. In other words, a power-transmissible region of the object detection coil 211 covers a power-transmissible region of the power transmission coil unit 210. The shape of the object detection coil 211 is not limited to the shape illustrated in FIG. 11B.

[Processing in Power Transmission Apparatus]

Figure 12:
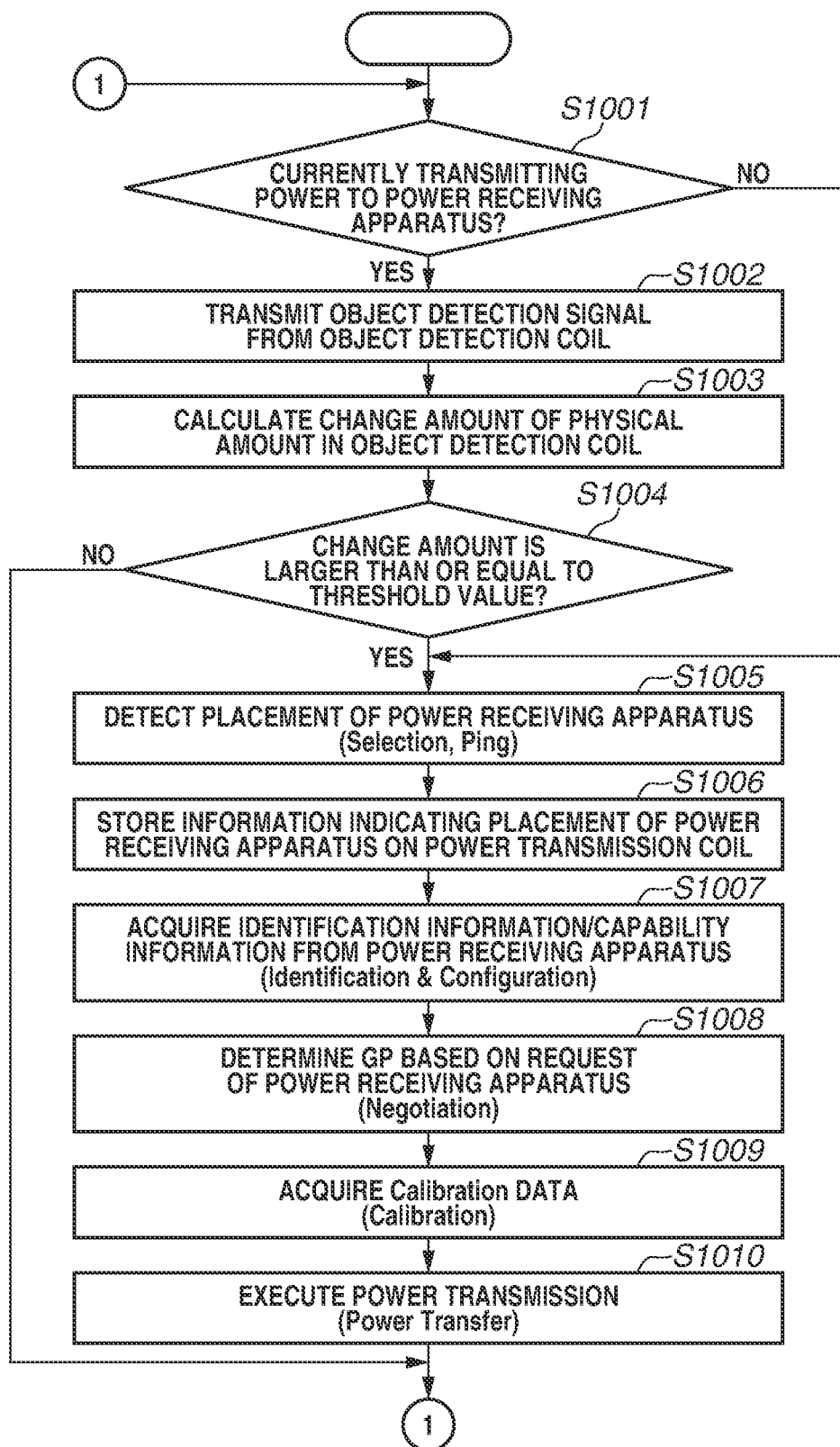
FIG. 12 is a flowchart illustrating processing that is performed by a power transmission apparatus according to a third exemplary embodiment.

A processing procedure that is executed by the power transmission apparatus 200 will be described. FIG. 12 is a flowchart illustrating processing that is executed by the power transmission apparatus 200. The processing can be implemented by the control unit 201 of the power transmission apparatus 200 executing a program read from the memory 207, for example. At least part of the following procedure can be implemented by hardware. The hardware in this case can be implemented by automatically generating a dedicated circuit that uses a gate array circuit, such as an FPGA, from a program for implementing each processing step by using a predetermined compiler, for example. The processing can be executed in response to the power of the power transmission apparatus 200 being turned ON, in response to a user of the power transmission apparatus 200 inputting a start instruction of a noncontact charging application, or in response to the power transmission apparatus 200 receiving power supply from a connected commercial power source. Alternatively, the processing can be started in response to a different trigger. The power transmission apparatus 200 executes the processing using a plurality of power transmission coils 209. The power transmission apparatus 200 can sequentially select one of the plurality of power transmission coils 209, and execute the processing using the selected power transmission coil 209. Alternatively, the power transmission apparatus 200 can concurrently execute the processing in a plurality of power transmission coils of the plurality of power transmission coils 209, or in all power transmission coils of the plurality of power transmission coils 209.

While a description will be given of a case where one or more power receiving apparatuses are placed on the power transmission apparatus 200 (e.g., on a charging stand (placement surface) configured to hold power receiving apparatuses in close proximity to a plurality of power transmission coils in the power transmission apparatus 200), but the case is not limited to this. The following description can also be applicable to a case where one or more power receiving apparatuses are present within a power-transmissible range of the power transmission apparatus 200, for example.

First of all, in step S1001, the power transmission apparatus 200 determines whether power is currently transmitted to a power receiving apparatus. In a case where power is currently transmitted to a power receiving apparatus (YES in step S1001), the processing proceeds to step S1002. In a case where power is not currently transmitted to a power receiving apparatus (NO in step S1001), the processing proceeds to step S1005. Next, in step S1002, the power transmission apparatus 200 transmits an object detection signal from the object detection coil 211, and the processing proceeds to step S1003. In this processing, the power transmission apparatus 200 transmits an A-ping once every second from the object detection coil 211 as an object detection signal to detect an object during a predetermined time length such as one second.

The object detection signal can be an A-ping defined in the WPC standard, but can be another signal. In step S1003, the power transmission apparatus 200 calculates a change amount of a physical amount in the object detection coil 211, and the processing proceeds to step S1004. The change amount of a physical amount can be calculated by measuring a current value of the object detection coil 211 that is generated by a change in the state of the object detection coil 211 and obtaining a difference from a lastly-measured value, but the calculation method is not limited to this. The change amount can be a difference in voltage value of a voltage applied to the object detection coil 211, a shift amount of a resonance frequency of the object detection coil 211, or a difference in characteristic impedance of the object detection coil 211, for example. In this manner, at least any of a current or a voltage generated in a coil and a resonance frequency changes in response to the transmission of an object detection signal in a case where the state inside the object detection coil 211 changes. Based on the change, the control unit 201 of the power transmission apparatus 200 can detect that there is a possibility that a power receiving apparatus has been newly placed. A current or a voltage in a coil or a resonance frequency changes because a magnetic flux in the coil changes, or a characteristic impedance changes due to a change in a state inside the object detection coil 211.

In step S1004, the power transmission apparatus 200 determines whether the change amount of the physical amount that has been calculated in the object detection coil 211 is larger than or equal to a threshold value. In other words, the power transmission apparatus 200 determines whether there is a possibility that a power receiving apparatus has been newly placed. In a case where the change amount of the physical amount is larger than or equal to the threshold value (YES in step S1004), the processing proceeds to step S1005. In a case where the change amount of the physical amount is smaller than the threshold value (NO in step S1004), the processing returns to step S1001. The case where the change amount of the physical amount is larger than or equal to the threshold value means that an object has been newly placed on the power transmission apparatus 200.

Next, in step S1005, the power transmission apparatus 200 starts the processing defined as the selection phase of the WPC standard as described above. The power transmission apparatus 200 sequentially transmits A-pings from the power transmission coils 209 and detects the position of an object within a power-transmissible range. In this processing, the power transmission apparatus 200 transmits A-pings from a plurality of power transmission coils 209 in one second to detect the position of an object during a predetermined time length such as one second. Accordingly, the power transmission apparatus 200 in this case sequentially transmits A-pings from a plurality of power transmission coils 209 every (1/N) seconds (N is the number of the power transmission coils 209), for example.

In a case where the power transmission apparatus 200 detects an object within a power-transmissible range, the power transmission apparatus 200 transitions to the ping phase of the WPC standard, and transmits a D-ping using the power transmission coil 209 that has detected the object. In a case where a predetermined response to the D-ping has been received, the power transmission apparatus 200 determines that the detected object is a power receiving apparatus and the power receiving apparatus has been placed on a targeted power transmission coil. In step S1006, the power transmission apparatus 200 stores information about the determination result. In a case where the power transmission apparatus 200 detects that a power receiving apparatus has been placed, the power transmission apparatus 200 transitions to the I & C phase of the above-described WPC standard, and in step S1007, the power transmission apparatus 200 acquires identifier information and capability information of the power receiving apparatus. Subsequently, the power transmission apparatus 200 transitions to the negotiation phase of the WPC standard as described above, and in step S1008, the power transmission apparatus 200 determines a value of GP together with the power receiving apparatus. After the GP has been determined, the power transmission apparatus 200 transitions to the calibration phase of the WPC standard as described above (step S1009). In this processing, the power receiving apparatus notifies the power transmission apparatus 200 of a predetermined receiving power value (receiving power value in a lightly-loaded state/receiving power value in a maximum load state), and the power transmission apparatus 200 performs adjustment to efficiently transmit power.

Next, the power transmission apparatus 200 transitions to the power transfer phase of the WPC standard as described above. In step S1010, the power transmission apparatus 200 performs control for power transmission continuance and a power transmission stop that is based on an error or full charge, and the processing returns to step S1001. In a case where power supply to the power transmission apparatus 200 is stopped, the power transmission apparatus 200 ends the processing.

As described above, in a case where the power transmission apparatus 200 of the present exemplary embodiment currently transmits power to a power receiving apparatus and has not detected the placement of an object, the power transmission apparatus 200 does not start processing for object detection in a power transmission coil (i.e., processing defined as the selection phases in the WPC standard as described above). With this configuration, it is possible to reduce a negative effect on ongoing power transmission due to radiated noise and the like. It is also possible to suppress unnecessary power consumption.

[Processing of Entire System]

Next, an operation sequence of the power transmission apparatus 200 will be described with reference to FIGS. 13, 14A, and 14B. The power transmission apparatus 200 includes three power transmission coils 209a to 209c and the object detection coil 211 as illustrated in FIG. 14A for the sake of simplification of description. As an initial state, no power receiving apparatus is placed on the power transmission apparatus 200, and the power transmission apparatus 200 has a sufficient power transmission capability to such a degree that power transmission is executable with GP requested by a power receiving apparatus. A threshold value for a change amount of a physical amount that is to be calculated in an object detection coil is preset in the power transmission apparatus 200 as a predetermined value. The threshold value can be set in accordance with an input operation performed by the user. In the following description, the wording "a power receiving apparatus is placed on a power transmission coil 209 of the power transmission apparatus 200" includes the following case. More specifically, a state in which the power receiving apparatus is placed on the power transmission coil 209 is synonymous with a state in which the power receiving apparatus is placed on a charging stand (placement surface) disposed in close proximity to the power transmission coil 209, or a state in which the power receiving apparatus is placed in close proximity to the power transmission coil 209 (power-transmissible range).

In the present exemplary embodiment, the power transmission apparatus 200 detects the placement of the first power receiving apparatus 101a and starts power transmission. In this processing, upon the start of power transmission to the first power receiving apparatus 101a, the power transmission apparatus 200 stops the transmission of an A-ping from the power transmission coil 209 and starts object detection by the transmission of an object detection signal from the object detection coil 211. Then, in a case where the second power receiving apparatus 101b is placed, a physical amount changes due to a change in the state of the object detection coil 211, and a difference in physical amount becomes a threshold value or more. The power transmission apparatus 200 thus determines that an object has been placed. The power transmission apparatus 200 restarts the transmission of an A-ping from the power transmission coil 209, detects the placement of the second power receiving apparatus 101b, and starts power transmission. After that, the power transmission apparatus 200 stops the transmission of an A-ping from the power transmission coil 209 again, and restarts object detection by transmitting an object detection signal from the object detection coil 211.

Figure 13:
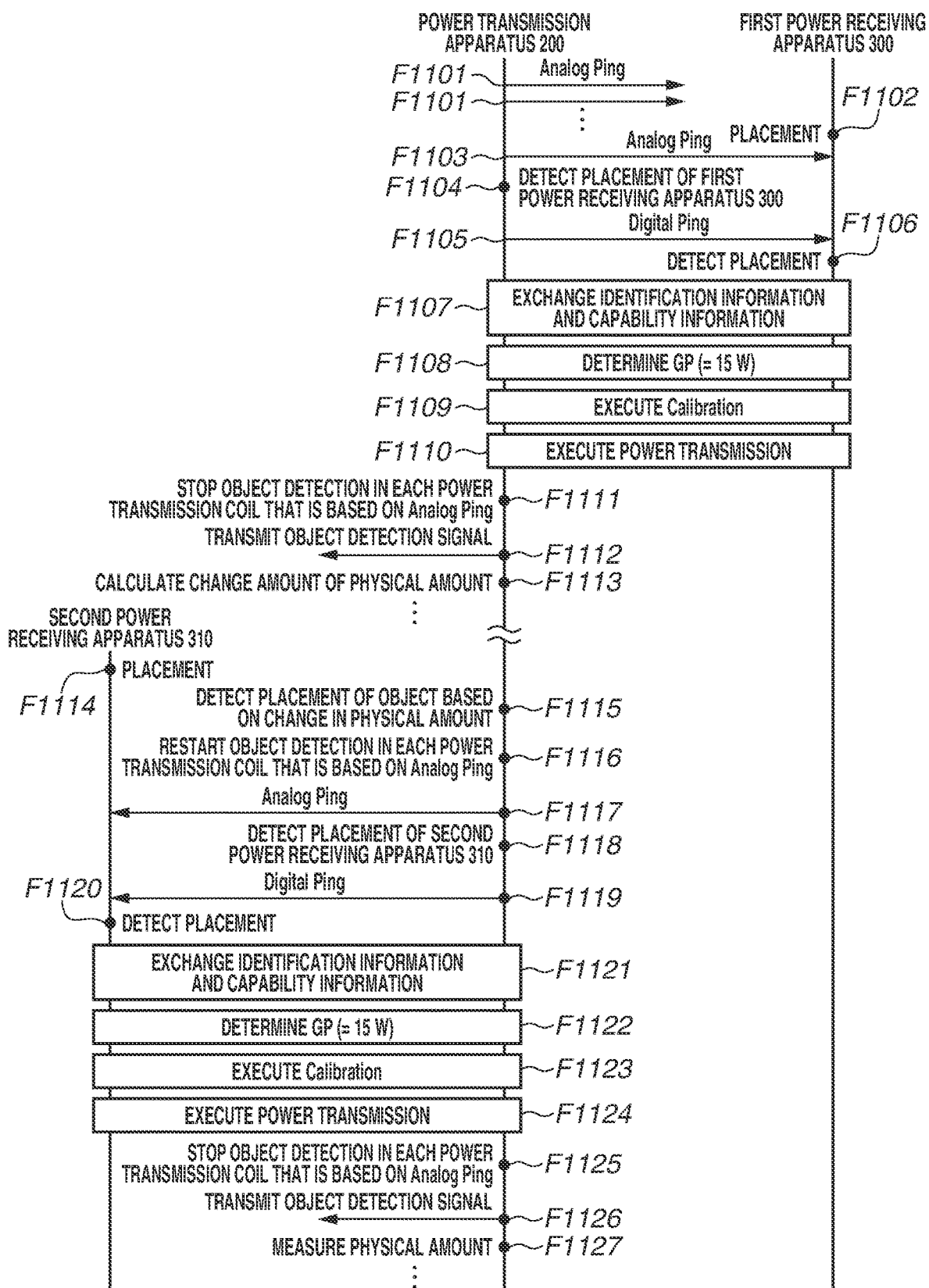
FIG. 13 is a sequence diagram illustrating processing that is performed by the power transmission apparatus and a power receiving apparatus according to the third exemplary embodiment.
Figure 14A:
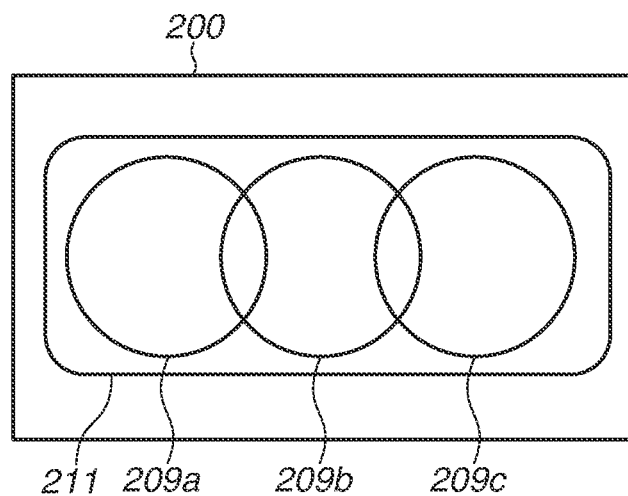
FIG. 14A is a diagram illustrating an example of arrangement of a power transmission coil unit and a power receiving apparatus.
Figure 14B:
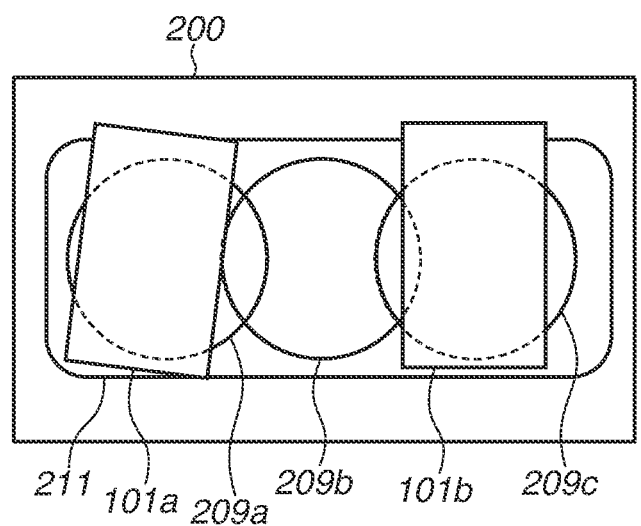
FIG. 14B is a diagram illustrating an example of arrangement of a power transmission coil unit and a power receiving apparatus.

In FIG. 13, because the power transmission apparatus 200 does not currently transmit power to a power receiving apparatus, the power transmission apparatus 200 waits for the placement of an object by sequentially transmitting A-pings from the power transmission coils 209a to 209c (NO in step S1001, step F1101). An A-ping transmitted from the power transmission coil 209a changes due to the placement of a first power receiving apparatus 300, and the power transmission apparatus 200 accordingly detects that an object has been placed (steps F1102, F1103, and F1104). Based on a D-ping which is subsequently transmitted, the first power receiving apparatus 300 detects that the first power receiving apparatus 300 has been placed on the power transmission apparatus 200 (in close proximity to the power transmission coil 209a) (step F1105 and F1106). In steps S1005 and S1006, based on a response to the D-ping, the power transmission apparatus 200 detects that the placed object is a power receiving apparatus (the first power receiving apparatus 300), and stores information about the placement of the power receiving apparatus on the power transmission coil 209a.

In step S1007 (step F1107), the power transmission apparatus 200 acquires identification information and capability information from the first power receiving apparatus 300 through communication in the I & C phase. Next, in step S1008 (step F1108), the power transmission apparatus 200 and the first power receiving apparatus 300 execute communication in the negotiation phase, and determine GP=15 w. In step S1009 (step F1109), the power transmission apparatus 200 and the first power receiving apparatus 300 derive calibration data through communication in the calibration phase. After that, in step S1010 (step F1110), the power transmission apparatus 200 executes power transmission to the first power receiving apparatus 300.

Because the power transmission apparatus 200 currently transmits power to the first power receiving apparatus 300, in steps S1001 to S1003 (steps F1111 to 1113), the power transmission apparatus 200 stops the transmission of an A-ping from the power transmission coil 209, performs the transmission of an object detection signal from the object detection coil 211, and calculates a change amount of a physical amount. At this time, because a new power receiving apparatus is not placed, and the calculated change amount of physical amount is smaller than the threshold value, the power transmission apparatus 200 determines that a new object has not been detected. The power transmission apparatus 200 repeatedly executes the transmission of an object detection signal and the calculation of a change amount of a physical amount at a predetermined interval (NO in step S1004, steps S1001 to S1003, steps F1112 to 1113). After that, in a case where a second power receiving apparatus 310 is placed, because the calculated change amount of physical amount is larger than or equal to the threshold value, the power transmission apparatus 200 determines that a new object has been detected. The power transmission apparatus 200 restarts the transmission of A-pings from the power transmission coils 209b and 209c excluding the power transmission coil 209a currently transmitting power (YES in step S1004, steps F1114 to 1116). An A-ping transmitted from the power transmission coil 209c changes due to the placement of the second power receiving apparatus 310, and the power transmission apparatus 200 accordingly detects that an object has been placed on the power transmission coil 209c (steps F1117 and F1118). Because the subsequent processing in steps F1119 to F1124 is similar to the processing in steps F1105 to F1110, the redundant description will be omitted. In a case where power transmission to the second power receiving apparatus 310 is executed via the power transmission coil 209c, because the power transmission apparatus 200 currently transmits power to the first power receiving apparatus 300 and the second power receiving apparatus 310, the power transmission apparatus 200 stops object detection by the transmission of an A-ping from the power transmission coil 209 again. The power transmission apparatus 200 transmits an object detection signal from the object detection coil 211, and calculates a change amount of a physical amount (YES in step S1001, steps S1002 to S1003, steps F1125 to 1127).

According to the above-described operation, after the start of power transmission to a power receiving apparatus, the power transmission apparatus 200 stops the transmission of an A-ping from each of the power transmission coils 209 and starts object detection in an object detection coil. Then, in response to detection of an object detected using an object detection coil, the power transmission apparatus 200 transmits an object detection signal (A-ping) from each of the power transmission coils 209 to detect a power receiving apparatus. Because the object detection coil is configured to cover the entire power transmission range of a power transmission coil unit, the number of times an object detection signal is transmitted from the object detection coil during a predetermined time length is smaller than the total number of times an A-ping is transmitted from the power transmission coils 209 during the same predetermined time length. With this configuration, it is possible to relatively suppress the generation of radiated noise, which leads to decrease of a negative effect on ongoing power transmission to a power receiving apparatus, and it is possible to detect the placement of a new power receiving apparatus. Transmitting an A-ping only from an object detection coil relatively reduces power consumption as compared with the case of transmitting an A-ping from each power transmission coil.

While, in the above-described exemplary embodiments, in a case where a power transmission apparatus 200 starts power transmission to a power receiving apparatus, the power transmission apparatus 200 stops the transmission of an A-ping from each power transmission coil, and transmits an object detection signal from an object detection coil to calculate a change amount of a physical amount, an object detection signal needs not be transmitted. In this processing, the power transmission apparatus 200 can calculate a change amount of a physical amount that is generated by a change in a state inside the object detection coil due to power transmitted from a power transmission coil currently transmitting power. With this configuration, as compared with a case where the object detection signal is transmitted, it is possible to further suppress the generation of radiated noise and suppress unnecessary power consumption.

While, in the above-described exemplary embodiments, in a case where the power transmission apparatus 200 does not currently transmit power to a power receiving apparatus, the power transmission apparatus 200 sequentially transmits A-pings from power transmission coils, the configuration is not limited to this. More specifically, even in a case where the power transmission apparatus 200 does not currently transmits power to a power receiving apparatus (no power receiving apparatus is placed), the power transmission apparatus 200 can transmit an object detection signal from the object detection coil 211 and calculate a change amount of a physical amount to perform object detection. With this configuration, even in a case where power is not currently transmitted to a power receiving apparatus, it is possible to suppress unnecessary power consumption.

While, in the above-described exemplary embodiments, the power transmission apparatus 200 includes an object detection coil 211 configured to cover the entire power transmission range of the power transmission coil unit 210, the configuration is not limited to this. For example, the power transmission apparatus 200 can select a specific power transmission coil 209 other than the power transmission coil 209 currently transmitting power and transmit an A-ping from the selected specific power transmission coil 209. With this configuration, as compared with the case of sequentially transmitting A-pings from the plurality of power transmission coils 209, it is possible to suppress the generation of radiated noise and suppress unnecessary power consumption. In the case of the configuration, the power transmission apparatus 200 needs not include the object detection coil 211 configured to surround the power transmission coil unit 210.

While, in the above-described exemplary embodiments, the power transmission apparatus 200 includes one object detection coil configured to cover the entire power transmission range of the power transmission coil unit 210, the configuration is not limited to this. The power transmission apparatus 200 can include a plurality of object detection coils. A description will be given of an example case where a plurality of object detection coils covering respective power-transmissible regions (e.g., the dedicated regions 416 and 417 in FIG. 4E) of power transmission circuits is arranged. In this case, the power transmission apparatus 200 can start object detection only in an object detection coil covering a power-transmissible region of a power transmission circuit currently not transmitting power, and in a case where an object has been detected, the power transmission apparatus 200 can transmit an A-ping only from a power transmission coil in the region covered by the object detection coil. In this manner, the number of signal transmission times becomes smaller by transmitting an A-ping only in a region in which it is determined that an object has been detected, as compared with the case of sequentially transmitting A-pings in the entire power transmission range. With this configuration, it is possible to relatively suppress the generation of radiated noise, which leads to further decrease of a negative effect on ongoing power transmission to a power receiving apparatus and realizes detection of the placement of a new power receiving apparatus.

As the issue described in the first exemplary embodiment, in a case where power transmission is simultaneously performed from a plurality of power transmission coils, inappropriate selection of power transmission coils leads to interference between the power transmission coils by power transmitted from the power transmission coils. In the first exemplary embodiment, the interference is prevented by power transmission using power transmission coils having a positional relationship not causing the interference (separated by the predetermined distance D or more). In a fourth exemplary embodiment, a different method for preventing the interference between power transmission coils will be described. In the present exemplary embodiment, the description will be especially given of a method for preventing influence (interference) between power transmission coils that occurs in a case where a power transmission coil is performing power transmission for charging and a different power transmission coil transmits an A-ping for object detection. As for configurations similar to those in the above-described exemplary embodiments, the same names and the same reference signs are used.

[Processing in Power Transmission Apparatus]

Figure 15:
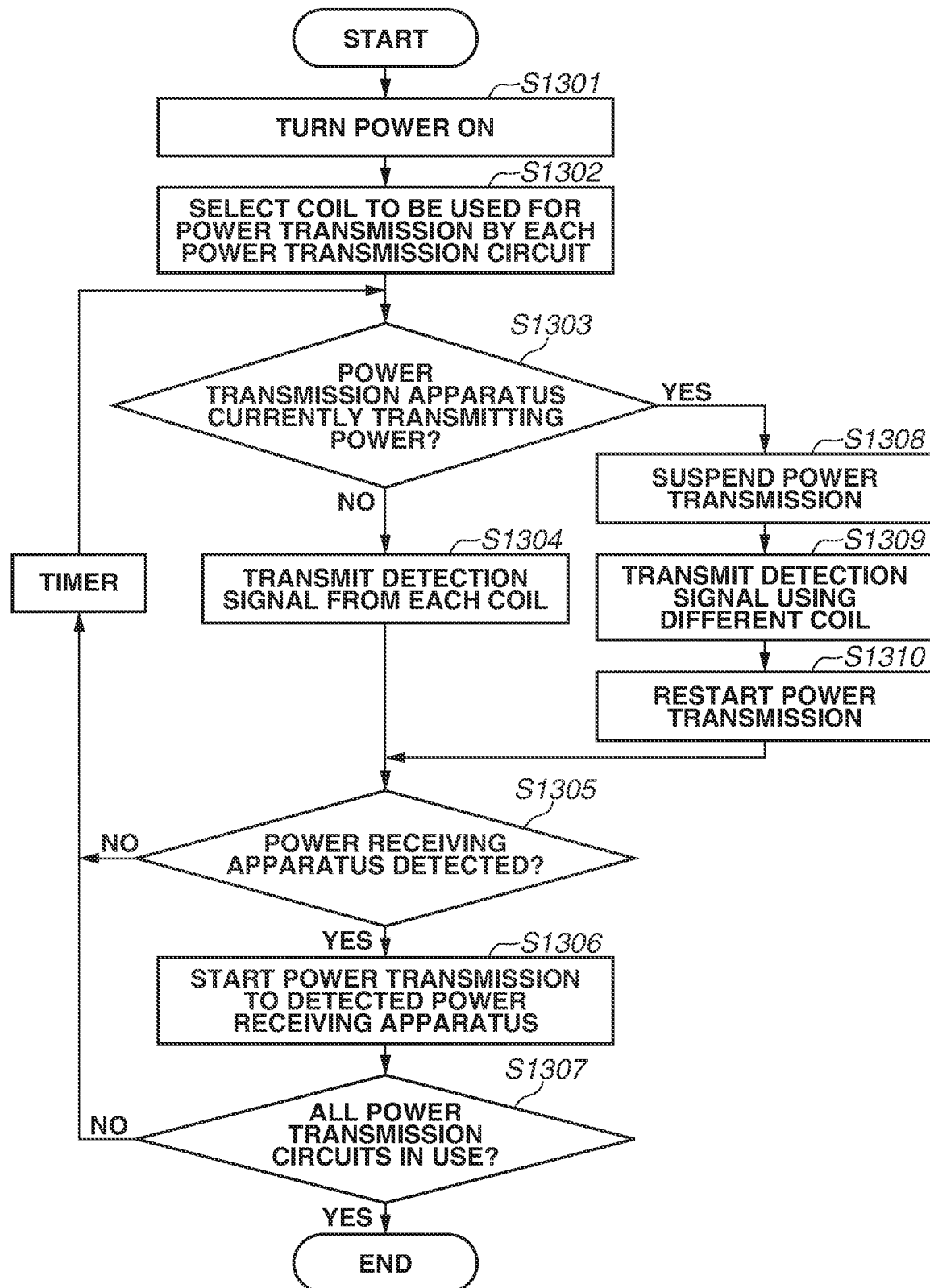
FIG. 15 is a flowchart illustrating processing that is performed by a power transmission apparatus according to a fourth exemplary embodiment.

FIG. 15 is a flowchart illustrating processing that is executed by the power transmission apparatus 100. The flowchart illustrated in FIG. 15 can be implemented by the control unit 201 of the power transmission apparatus 100 executing a control program stored in the memory 207 and executing information calculation and processing and control of each hardware component.

First of all, in step S1301, the processing is started upon the power of the power transmission apparatus 100 being turned ON. In step S1302, the power transmission apparatus 100 selects, by using the control unit 201, a first power transmission coil to be used for power transmission by the first power transmission circuit 203 and a second power transmission coil to be used for power transmission by the second power transmission circuit 205, from among the power transmission coil unit 210, and connects the power transmission circuits and the respective selected power transmission coils. In a case where A-pings are simultaneously transmitted from the first power transmission circuit 203 and the second power transmission circuit 205, the power transmission apparatus 100 also selects power transmission coils not interfering with each other. In this processing, the selection method can be the method described in the first exemplary embodiment, for example.

Next, in step S1303, the power transmission apparatus 100 determines whether a power transmission circuit currently transmits power. In this case, because it is right after the power of the power transmission apparatus 100 has been turned ON, the power transmission apparatus 100 determines that power transmission is executed in neither of the power transmission circuits (NO in step S1303). Next, in step S1304, the power transmission apparatus 100 transmits the above-described a-ping from each power transmission coil connected to a corresponding power transmission circuit. The power of the A-ping is smaller than power transmitted during power transmission.

Next, in step S1305, the power transmission apparatus 100 determines whether a power receiving apparatus has been placed on the power transmission coil of the power transmission apparatus 100. In a case where the power transmission apparatus 100 detects that an object is placed on the power transmission apparatus 100, using an A-ping, the power transmission apparatus 100 detects the placement of a power receiving apparatus through the selection phase, the ping phase, and the I & C phase described above (YES in step S1305), and the processing proceeds to step S1306.

Next, in step S1306, the power transmission apparatus 100 executes power transmission processing on the power receiving apparatus detected in step S1305, through a plurality of phases defined in the WPC standard as described above, and starts power transmission.

Next, in step S1307, the power transmission apparatus 100 determines whether all power transmission circuits of the power transmission apparatus 100 are in use. In a case where all power transmission circuits are in use (YES in step S1307), the power transmission apparatus 100 ends the control for power transmission. Until a power transmission stop command (EPT) from a power receiving apparatus is received due to full charge of a battery of the power receiving apparatus, for example, the power transmission apparatus 100 performs power transmission for charging, which is not illustrated in FIG. 15. In a case where the power transmission apparatus 100 ends power transmission for charging, the power transmission apparatus 100 executes the processing in step S1303 and subsequent steps again to detect a new power receiving apparatus. The processing in step S1303 and subsequent steps is repeatedly executed until the power of the power transmission apparatus 100 is turned OFF. Also in a case where a power receiving apparatus has not been detected in step S1305 before a predetermined time elapses, the processing returns to step S1303 after the lapse of the predetermined time.

Next, a case where it is determined in step S1303 that the power transmission apparatus 100 currently transmits power will be described. In this example, the first power transmission circuit 203 and the second power transmission circuit 205 can transmit power using the first power transmission coil and the second power transmission coil, respectively. The control to be described here is performed for the following reason. More specifically, in a case where power transmission from the first power transmission coil and the transmission of an A-ping as an object detection signal from the second power transmission coil are simultaneously performed, the A-ping smaller as power is sometimes disturbed by the transmitted large power. Thus, the A-ping transmitted from the second power transmission coil is unable to properly function as a detection signal, and this may lead to false detection of an object. The power transmission apparatus 100 according to the present exemplary embodiment prevents the issue of the disturbance of the A-ping by performing the following processing.

In a case where it is determined in step S1303 that the power transmission apparatus 100 currently transmits power (YES in step S1303), the processing proceeds to step S1308. In step S1308, the power transmission apparatus 100 temporarily interrupts power transmission from the first power transmission circuit 203, and stops power transmission. Then, during a period (moment) over which power transmission from the power transmission apparatus 100 is stopped, a detection signal is transmitted from a different power transmission coil not currently used for power transmission. In this example, the second power transmission coil is not currently used for power transmission, and a detection signal is transmitted from the second power transmission coil. In step S1308, the power transmission apparatus 100 stops (temporarily interrupts) power transmission from the first power transmission coil currently transmitting power, for a predetermined period. Then, in step S1309, during a period over which power transmission from the first power transmission coil is stopped, a detection signal is transmitted from the second power transmission coil currently not performing power transmission. That is, during a period over which power transmission from the first power transmission circuit 203 currently performing power transmission is stopped, an A-ping is transmitted using the second power transmission circuit 205 currently not performing power transmission. Then, after power transmission has been stopped for the predetermined period, in step S1310, the power transmission apparatus 100 restarts power transmission. In this processing, an A-ping output by the second power transmission circuit 205 for object detection is to be controlled to not overlap power transmission performed by the first power transmission circuit 203. That is, a period over which power transmission from the first power transmission coil is stopped is controlled to be longer than a period for a detection signal being transmitted from the second power transmission coil. Thus, the predetermined period over which power transmission is stopped is a period longer than a period for the second power transmission circuit 205 performing object detection. With this processing, it is possible to transmit a detection signal transmitted from the second power transmission coil without overlap between power for charging transmitted from the first power transmission coil and transmission of a detection signal transmitted from the second power transmission coil.

A stop timing of transmission of power for charging from the power transmission apparatus 100 and a detection signal transmission timing will be described with reference to FIG. 16. While, in the above-described exemplary embodiments, the description has been given of a case where the power transmission apparatus 100 performs the power transmission processing using two power transmission circuits and two power transmission coils respectively connected to the two power transmission circuits, the application of the present exemplary embodiment is not limited to this. The present exemplary embodiment is applicable also to power transmission processing that is performed using a further larger number of power transmission circuits and power transmission coils. In the following example, the first power transmission circuit 203 currently performs power transmission for charging using a first power transmission coil. The second power transmission circuit 205 is sequentially connected with a second power transmission coil, a third power transmission coil, and a fourth power transmission coil, and transmits an A-ping from each of the second to fourth power transmission coils.

In FIG. 16, the first power transmission coil is used for power transmission, and performs power transmission to a power receiving apparatus. Then, after the lapse of the predetermined time, in step S1308, the first power transmission circuit 203 stops (temporarily interrupts) power transmission from the first power transmission coil at a first timing for a predetermined period. Then, during a period over which power transmission is stopped, in step S1309, the second power transmission circuit 205 transmits an A-ping using the second power transmission coil. After the power transmission has been stopped for the predetermined period, in step S1310, the first power transmission circuit connected to the first power transmission circuit 203 restarts power transmission. In a case where a power receiving apparatus has not been detected by the second power transmission circuit 205 (NO in step S1305), after the lapse of the predetermined time, in step S1308, the first power transmission circuit 203 stops (temporarily interrupts) power transmission from the first power transmission coil at a second timing for a predetermined period. Then, during a period over which power transmission is stopped, in step S1309, the second power transmission circuit 205 transmits an A-ping using the third power transmission coil. After power transmission has been stopped for the predetermined period, in step S1310, the first power transmission circuit 203 restarts power transmission. In a case where a power receiving apparatus has not been detected by the second power transmission circuit 205 (NO in step S1305), after the lapse of the predetermined time, in step S1308, the first power transmission circuit 203 stops (temporarily interrupts) power transmission from the first power transmission coil at a third timing for a predetermined period. Then, during a period over which power transmission is stopped, in step S1309, the second power transmission circuit 205 transmits an A-ping using the fourth power transmission coil. After power transmission has been stopped for the predetermined period, in step S1310, the first power transmission circuit 203 restarts power transmission.

The above-described processing is repeatedly performed until the second power transmission circuit 205 detects a power receiving apparatus. In a case where the second power transmission circuit 205 detects an object placed on the power transmission apparatus 100, using an A-ping, and detects a power receiving apparatus through the predetermined phases (YES in step S1305), in step S1306, the power transmission apparatus 100 starts power transmission to the power receiving apparatus detected in step S1305, using the second power transmission circuit 205.

In this manner, by sequentially transmitting detection signals from different power transmission coils during interruption of power transmission for charging, the power transmission apparatus 100 can periodically check whether a power receiving apparatus is in close proximity of each of the power transmission coils. A timing at which the power transmission apparatus 100 stops power transmission for charging may be preset in the power transmission apparatus 100. The predetermined period during which power transmission is stopped by the power transmission apparatus 100 can be set to a length that does not affect power receiving processing of a power receiving apparatus. Alternatively, the power transmission apparatus 100 can be configured to perform the above-described processing after determining whether power transmission can be temporarily interrupted without any problem, based on the version of a power receiving apparatus to which power for charging is currently transmitted. The power transmission apparatus 100 can share a temporal interruption timing of power transmission with the power receiving apparatus by transmitting information indicating a temporal interruption timing of power transmission, to the power receiving apparatus or acquiring the information from the power receiving apparatus in the negotiation phase, for example.

Configurations of the power transmission circuits and the power transmission coils are not limited to the above-described configurations. For example, four power transmission circuits can be used. In this configuration, a first power transmission coil is connected to a first power transmission circuit, a second power transmission coil is connected to a second power transmission circuit, a third power transmission coil is connected to a third power transmission circuit, and a fourth power transmission coil is connected to a fourth power transmission circuit. The number of power transmission coils can also be any number.

While, in the above-described exemplary embodiment, the power transmission apparatus 100 sequentially transmits detection signals from power transmission coils not currently used for power transmission, A-pings serving as detection signals can be simultaneously transmitted from a plurality of coils. More specifically, the power transmission apparatus 100 suspends (temporarily interrupt) power transmission from the first power transmission coil, and during a period over which the power transmission is stopped, the power transmission apparatus 100 can simultaneously transmits A-pings from the second power transmission coil, the third power transmission coil, and the fourth power transmission coil. Alternatively, a configuration in which a first power transmission coil and a second power transmission coil is connected to a first power transmission circuit, a third power transmission coil is connected to a second power transmission circuit, and a fourth power transmission coil is connected to a third power transmission circuit can be used. Then, in the above-described configuration, the power transmission apparatus 100 suspends (temporarily interrupt) power transmission from the first power transmission coil, the first power transmission circuit is connected to the second power transmission coil, and the power transmission apparatus 100 can simultaneously transmits A-pings from the second power transmission coil, the third power transmission coil, and the fourth power transmission coil. A combination of power transmission coils that simultaneously transmit A-pings at this time may be determined using the method in the first exemplary embodiment, for example.

While, in the present exemplary embodiment described above, a detection signal transmitted from the power transmission apparatus 100 has been described as a signal for detecting a power receiving apparatus, the detection signal can be used for detecting a foreign object (object) different from a power receiving apparatus. If a conductive foreign object is on a power transmission apparatus, for example, when the power transmission apparatus performs power transmission, power is consumed by the foreign object, and the foreign object may produce heat. In view of the foregoing, the power transmission apparatus 100 uses an A-ping transmitted in step S1304 or S1309 to detect presence of an object, and in a case where it is determined that "a foreign object is present" or "a foreign object is likely present", the power transmission apparatus 100 can perform control to stop power transmission. The determination of presence or absence of a foreign object can be performed through the ping phase, the selection phase, the ping phase, the I & C phase, and the negotiation phase described above. With this configuration, the power transmission apparatus 100 illustrated in FIGS. 14A and 14B can periodically check whether a foreign object is present in close proximity of the power transmission coils by sequentially transmitting detection signals from each of the power transmission coils not currently used for power transmission. Thus, the power transmission apparatus can accurately detect a foreign object on the power transmission apparatus.

Alternatively, a foreign object can be detected based on a transient response of a voltage or a current in a power transmission coil that is received when power transmission is temporarily interrupted.

In the above-described exemplary embodiments, the configuration that can simultaneously transmit power to the power receiving apparatuses from both of the first power transmission circuit and the second power transmission circuit has been described. Alternatively, a configuration of transmitting power only from either one of the power transmission circuits without simultaneously transmitting power from the power transmission circuits can be used. More specifically, in a case where it is detected using the first power transmission coil that a first power receiving apparatus is present, and it is detected that a second power receiving apparatus is also present in close proximity of the second power transmission coil (YES in step S1305), after step S1305, selection of either one of the power receiving apparatuses is performed based on a predetermined condition. The predetermined condition for the selection of a power receiving apparatus can be a priority (priority order) of a power receiving apparatus to which power is to be transmitted, for example. The priority is information that is used by the power transmission apparatus to determine a priority between the first power receiving apparatus and the second power receiving apparatus through communication between the power transmission apparatus and the first power receiving apparatus and the second power receiving apparatus. The power transmission apparatus selects either one of the power receiving apparatuses as a power receiving apparatus to which power is to be transmitted, for the following reason. For example, in a case where transmitting power transmitted from the first power transmission circuit and transmitting power transmitted from the second power transmission circuit are both very large, even if a power transmission coil to be used for power transmission is appropriately selected, power transmitted from the first power transmission circuit and power transmitted from the second power transmission circuit sometimes interfere with each other. This may cause a communication error or the like between the power transmission apparatus and a power receiving apparatus. In addition, noise that is generated by power being transmitted from the power transmission circuits may become larger than a reference value. For this reason, by executing the "selection of a power receiving apparatus", and performing power transmission to the selected power receiving apparatus, electric interference is prevented.

Even in a case where power for power transmission from the power transmission circuits exceeds a power supply capability of hardware of the power transmission apparatus, power transmission can be appropriately performed by performing the "selection of a power receiving apparatus". Also in a case where such "selection of a power receiving apparatus" is performed, whether a new power receiving apparatus is placed on a power transmission apparatus is regularly checked by using the method of the present exemplary embodiment, and even in a case where a power receiving apparatus with high priority is newly placed, for example, it is possible to promptly start detection and power transmission.

In a fifth exemplary embodiment, an operation of the power transmission apparatus 100 that is performed in a case where the first power receiving apparatus 101a and the second power receiving apparatus 101b are placed on the power transmission coil unit 210 will be described. An issue addressed in the present exemplary embodiment will be described with reference to FIGS. 17A to 17D. FIGS. 17A to 17D are arrangement configuration diagrams of the power transmission coil unit 210 and a power receiving apparatus (apparatuses). The configuration of a power transmission apparatus according to the present exemplary embodiment is similar to that in the first exemplary embodiment, and the first power transmission circuit 203 and the second power transmission circuit 205 included in the power transmission apparatus 100 can each transmit power up to one power receiving apparatus.

FIG. 17A illustrates a state in which the first power receiving apparatus 101a is placed in the common region 415, and no power receiving apparatus is placed in the dedicated region 416 of the first power transmission circuit 203 and the dedicated region 417 of the second power transmission circuit 205. FIG. 17B illustrates a state in which the second power receiving apparatus 101b is placed in the dedicated region 416 of the first power transmission circuit 203 from the state illustrated in FIG. 17A. In this example, the first power transmission circuit 203 currently transmits power to the first power receiving apparatus 101a placed in the common region 415 in FIG. 17A. In this case, in a case where the second power receiving apparatus 101b is newly placed in the dedicated region 416 of the first power transmission circuit 203 as illustrated in FIG. 17B, the first power transmission circuit 203 cannot transmit power to the second power receiving apparatus 101b. This is because the number of power receiving apparatuses to which the first power transmission circuit 203 can simultaneously transmit power is one. In this manner, even in a case where the power transmission apparatus 100 includes two power transmission circuits and is configured to be able to simultaneously transmit power to two power receiving apparatuses, depending on the placement order or the placed positions of power receiving apparatuses, the power transmission apparatus 100 can transmit power only to one power receiving apparatus.

Hereinafter, an exemplary embodiment for enabling power transmission control to be appropriately performed irrespective of a placement condition of a power receiving apparatus (apparatuses) in a power transmission apparatus that can transmit power to a plurality of power receiving apparatuses will be described. As for configurations similar to those in the above-described other exemplary embodiments, the same names and the same reference signs are used.

[Processing in Power Transmission Apparatus]

Processing that is performed by the power transmission apparatus according to the present exemplary embodiment will be described with reference to FIGS. 17A to 17D, and 18. The processing can be started in response to the first power transmission circuit 203 starting up based on power input by reception of power supply from the power source unit 202. The processing can be implemented by the control unit 201 executing a program stored in the memory 207. The execution trigger of the processing is not limited to these. For example, the processing can be executed in response to a power transmission function starting up in response to a user's operation pressing a predetermined button. At least part of the processing illustrated in FIG. 18 can be implemented by hardware. In a case where at least part of the processing is implemented by hardware, for example, a dedicated circuit automatically generated on an FPGA using a predetermined compiler from a program for implementing the processing step can be used. Similarly to the FPGA, hardware for executing a predetermined processing step may be implemented by a Gate Array circuit.

In FIG. 18, the processing is started upon the power of the power transmission apparatus 100 being turned ON. In step S1600, the power transmission apparatus 100 transmits an A-ping, and determines whether a power receiving apparatus has been placed. In this example, the first power receiving apparatus 101a is placed in the common region 415 as illustrated in FIG. 17A. In a case where the power transmission apparatus 100 detects the placement of a power receiving apparatus (YES in step S1600), the processing proceeds to step S1602.

The power transmission apparatus 100 transmits a D-ping, and in a case where the power transmission apparatus 100 receives a signal strength packet, the power transmission apparatus 100 determines that the first power receiving apparatus 101a has been detected. In this example, the D-ping has been transmitted by the first power transmission circuit 203. In step S1602, the power transmission apparatus 100 compares the number of power receiving apparatuses to which power is currently transmitted (being in the power transfer phase) and an upper limit of the number of power receiving apparatuses to which the power transmission apparatus 100 can transmit power. In the example illustrated in FIG. 17A, the first power transmission circuit 203 transmits a D-ping to the first power receiving apparatus 101a, but the first power receiving apparatus 101a is not a power receiving apparatus to which power is currently transmitted in the power transfer phase. Thus, the number of power receiving apparatuses is zero. The upper limit of the first power transmission circuit 203 is one as described above. Because the upper limit is larger than the number of power receiving apparatuses to which power is currently transmitted (YES in step S1602), the power transmission apparatus 100 advances the processing to step S1611. In step S1611, the power transmission apparatus 100 compares the number of power receiving apparatuses to which power is currently transmitted in a region in which the power receiving apparatus has been detected and an upper limit of the number of power receiving apparatuses to which power can be transmitted in the region in which the power receiving apparatus has been detected. In this step, the number of power receiving apparatuses in the common region 415 and the upper limit of the number of power receiving apparatuses to which the first power transmission circuit 203 can transmit power in the common region 415 are compared. Because a power receiving apparatus to which power is currently transmitted does not exist in the common region 415 at the time, the number of power receiving apparatuses is zero. The upper limit of the number of power receiving apparatuses to which the first power transmission circuit 203 can transmit power in the common region 415 is one. Thus, the number of power receiving apparatuses is smaller than the upper limit of the region (YES in step S1611), the processing proceeds to step S1607. In step S1607, the power transmission apparatus 100 determines that the first power transmission circuit 203 that has detected the first power receiving apparatus 101a performs power transmission to the first power receiving apparatus 101a, and ends the processing. Because the power transmission circuit that is to transmit power to the power receiving apparatus has been determined, the power transmission apparatus 100 transmits power to the first power receiving apparatus 101a based on the procedure illustrated in FIG. 5.

As illustrated in FIG. 17B, the second power receiving apparatus 101b is further placed in the dedicated region 416 of the first power transmission circuit 203. The power transmission apparatus 100 detects the second power receiving apparatus 101b using an A-ping (YES in step S1600).

Although the power transmission apparatus 100 currently transmits power to the first power receiving apparatus 101*a*, the power transmission apparatus 100 can detect the second power receiving apparatus 101*b* using an object detection coil described in the third exemplary embodiment. Alternatively, as described in the fourth exemplary embodiment, during the temporary interruption of power transmission to the first power receiving apparatus 101*a* that is performed by the first power transmission circuit 203 in the common region 415, the power transmission apparatus 100 can detect the second power receiving apparatus 101*b*. Specifically, during the temporary power transmission interruption, the power transmission apparatus 100 can detect the second power receiving apparatus 101*b* placed in the dedicated region 416 by using a power transmission coil included in the dedicated region 416.

In a case where the power transmission apparatus 100 detects the second power receiving apparatus 101*b*, in step S1602, the power transmission apparatus 100 compares the number of power receiving apparatuses to which power is currently transmitted and the upper limit of the number of power receiving apparatuses to which the first power transmission circuit 203 can transmit power. Because the first power transmission circuit 203 currently transmits power to the first power receiving apparatus 101*a*, the number of power receiving apparatuses is one. Because the upper limit of the number of power receiving apparatuses to which the first power transmission circuit 203 can transmit power is one, it is determined that the upper limit is not greater than the number of power receiving apparatuses to which power is currently transmitted (NO in step S1602). Then, in step S1601, the power transmission apparatus 100 acquires a region where the detected power receiving apparatus is placed, including a region where the power receiving apparatus to which power is currently transmitted is placed. Detection of where a power receiving apparatus is placed can be performed based on a power transmission coil received a signal strength packet among power transmission coils in FIG. 4E.

Because the first power transmission circuit 203 currently transmits power to the first power receiving apparatus 101*a* in the common region 415 (YES in step S1603), the processing proceeds to step S1604. In step S1604, the power transmission apparatus 100 selects a different power transmission circuit that can transmit power in the common region 415. In this example, because the second power transmission circuit 205 can transmit power in the common region 415, in step S1604, the power transmission apparatus 100 selects the second power transmission circuit 205, and in step S1605, compares the number of power receiving apparatuses to which the second power transmission circuit 205 currently transmits power and the upper limit of the number of power receiving apparatuses to which the second power transmission circuit 205 can transmit power. Because the second power transmission circuit 205 currently transmits power to no power receiving apparatus at the time point, the upper limit (=1) is larger than the number of power receiving apparatuses (=0) (YES in step S1605). Next, in step S1610, the power transmission apparatus 100 compares the number of power receiving apparatuses to which power is currently transmitted in the common region and the upper limit of the number of power receiving apparatuses to which power can be transmitted in the common region. Because power is currently transmitted to the first power receiving apparatus 101*a* in the common region 415, the number of power receiving apparatuses is one. The upper limit of the number of power receiving apparatuses to which the second power transmission circuit 205 can transmit power in the common region 415 is one. Accordingly, because the number of power receiving apparatuses is smaller than or equal to the upper limit of the number of power receiving apparatuses to which power can be transmitted in the common region 415 (YES in step S1610), the processing proceeds to step S1606. In step S1606, the power transmission apparatus 100 determines that second power transmission circuit 205, which is currently selected, transmits power to the first power receiving apparatus 101*a* placed in the common region 415.

In step S1609, the power transmission apparatus 100 stops power transmission from the first power transmission circuit 203 currently transmitting power in the common region 415. Based on the procedure illustrated in FIG. 5, the second power transmission circuit 205 transmits power to the first power receiving apparatus 101*a* in the common region 415. In this processing, the first power transmission circuit 203 enters a state of transmitting power to no power receiving apparatus. In step S1600, the power transmission apparatus 100 detects the second power receiving apparatus 101*b* placed in the dedicated region 416 by using the first power transmission circuit 203, and in step S1602, compares the number of power receiving apparatuses to which power is currently transmitted and the upper limit of the number of power receiving apparatuses to which the first power transmission circuit 203 can transmit power in the dedicated region 416. As a result of comparison, the power transmission apparatus 100 determines that the upper limit (=1) of the number of power receiving apparatuses to which the first power transmission circuit 203 can transmit power in the dedicated region 416 is larger than the number of power receiving apparatuses (=0) to which power is currently transmitted (YES in step S1602), and the processing proceeds to step S1611. Because the power transmission apparatus 100 has already detected the second power receiving apparatus 101*b*, the detection processing here can be omitted. In step S1611, the power transmission apparatus 100 compares the number of power receiving apparatuses (=0) to which power is currently transmitted and an upper limit (=1) of the number of power receiving apparatuses to which the first power transmission circuit 203 can transmit power in the dedicated region 416, and in step S1607, performs power transmission to the second power receiving apparatus 101*b*.

The above-described processing is the power transmission control processing performed by the power transmission apparatus 100 according to the present exemplary embodiment. By the above-described control, it is possible to efficiently transmit power to a plurality of power receiving apparatuses using a plurality of power transmission circuits.

Another example of power transmission control will be described. In this example, in FIG. 17B, the second power receiving apparatus 101*b* is initially placed in the dedicated region 416 of the first power transmission circuit 203, and then, the first power receiving apparatus 101*a* is placed in the common region 415. In this case, the power transmission apparatus 100 first performs power transmission to the second power receiving apparatus 101*b* by using the first power transmission circuit 203. Then, when the first power receiving apparatus 101*a* is placed in the common region 415, the power transmission apparatus 100 detects the first power receiving apparatus 101*a* by using the first power transmission circuit 203 or the second power transmission circuit 205. In a case where the first power transmission circuit 203 has detected the first power receiving apparatus 101*a*, it is determined in step S1602 that the upper limit of the number of power receiving apparatuses to which the first power transmission circuit 203 can transmit power in the common region 415 is not greater than the number of power receiving apparatuses to which the first power transmission circuit 203 can transmit power (NO in step S1602), and thus the processing proceeds to step S1604. In step S1604, the power transmission apparatus 100 selects the second power transmission circuit 205 and transmits power to the first power receiving apparatus 101a by using the second power transmission circuit 205. In a case where the second power transmission circuit 205 has detected the first power receiving apparatus 101a, because it is determined in step S1602 that the upper limit of the number of power receiving apparatuses to which the second power transmission circuit 205 can transmit power is greater than the number of power receiving apparatuses to which the second power transmission circuit 205 can transmit power in the common region 415 (YES in step S1602), in step S1607, the second power transmission circuit 205 transmits power to the first power receiving apparatus 101a.

From the state illustrated in FIG. 17B, a third power receiving apparatus is placed in the dedicated region 417 of the second power transmission circuit 205, which is not illustrated in FIG. 17B. In this case, the upper limit (=1) of the number of power receiving apparatuses to which the second power transmission circuit 205 can transmit power in the dedicated region 417 is not greater than the number of power receiving apparatuses (=1) to which power is currently transmitted (NO in step S1605). The processing thus proceed to step S1608. In step S1608, the power transmission apparatus 100 determines that power transmission to the third power receiving apparatus is performed neither of the power transmission circuits. In detection of the third power receiving apparatus, the power transmission apparatus 100 can also detect the second power receiving apparatus 101b by using an object detection coil described in the third exemplary embodiment. Alternatively, as described in the fourth exemplary embodiment, the power transmission apparatus 100 can temporarily interrupt power transmission performed by the first power transmission circuit 203 in the dedicated region 416 and power transmission performed by the second power transmission circuit 205 in the common region 415, and operate based on the procedure illustrated in FIG. 15. Specifically, during the temporary power transmission interruption, the first power transmission circuit 203 periodically transmits A-pings using power transmission coils included in the dedicated region 416 and the common region 415. Alternatively, during the temporary power transmission interruption, the second power transmission circuit 205 can periodically transmit A-pings using power transmission coils included in the dedicated region 417 and the common region 415, and detect the third power receiving apparatus.

In a case where the first power receiving apparatus 101a and the second power receiving apparatus 101b are placed in the dedicated region 416 of the first power transmission circuit 203 and the dedicated region 417 of the second power transmission circuit 205, respectively, as illustrated in FIG. 17C, the following operation is performed. Specifically, in accordance with the processing in steps S1602, S1611, and S1607, the first power transmission circuit 203 and the second power transmission circuit 205 transmit power to the first power receiving apparatus 101a and the second power receiving apparatus 101b, respectively.

A description will be given of a case where the first power receiving apparatus 101a is initially placed in the dedicated region 416 of the first power transmission circuit 203, and during power transmission from the first power transmission circuit 203 to the first power receiving apparatus 101a, the second power receiving apparatus 101b is placed in the dedicated region 416 of the first power transmission circuit 203 as illustrated in FIG. 17D. In this case, the power transmission apparatus 100 detects the second power receiving apparatus 101b using the above-described method in the third exemplary embodiment or the fourth exemplary embodiment. In this case, at the time point at which the second power receiving apparatus 101b is placed, power cannot be transmitted to any more power receiving apparatus in the dedicated region 416 (NO in step S1610). Thus, in step S1608, the power transmission apparatus 100 determines that none of the power transmission circuits transmit power to the second power receiving apparatus 101b.

[Processing of Entire System]

The processing of the entire system will be described with reference to FIGS. 17A, 17B, and 19. In step F1700, the power transmission apparatus 100 transmits A-pings by using the first power transmission circuit 203 and the second power transmission circuit 205, and performs power receiving apparatus detection processing. At this time, the first power receiving apparatus 101a is placed in the common region 415 and is detected by an A-ping transmitted by the first power transmission circuit 203. In step F1701, the first power transmission circuit 203 transmits a D-ping to the first power receiving apparatus 101a, and in step F1702, performs power transmission for charging in accordance with the procedure illustrated in FIG. 5. In step F1703, the second power receiving apparatus 101b is further placed in the dedicated region 416 of the first power transmission circuit 203 and is detected by an A-Ping transmitted by the first power transmission circuit 203. In step F1711, the first power transmission circuit 203 transmits a D-ping and performs the processing in step S1602 of FIG. 18. Because the first power transmission circuit 203 currently transmits power to the first power receiving apparatus 101a (NO in step S1602), in step S1604, the power transmission apparatus 100 selects the second power transmission circuit 205, and in step S1606, performs control to transmit power to the first power receiving apparatus 101a by using the second power transmission circuit 205. In step S1609 (step F1704), the power transmission apparatus 100 stops power transmission to the first power receiving apparatus 101a that has been performed by the first power transmission circuit 203. While, in FIG. 19, a D-ping is transmitted in step F1711, power transmission stop can be performed in step F1704 without transmitting a D-ping.

The second power transmission circuit 205 transmits an A-ping in step F1705 and a D-ping in step F1706, and performs power transmission to the first power receiving apparatus 101a in step F1707. The first power transmission circuit 203 transmits an A-ping in step F1708 and a D-ping in step F1709, and performs power transmission to the second power receiving apparatus 101b in step F1710.

As described above, in a case where a power receiving apparatus is placed, the power transmission apparatus according to the present exemplary embodiment determines a power transmission circuit that transmits power to the placed power receiving apparatus, based on an upper limit of the number of power receiving apparatuses to which a power transmission circuit can transmit power and a placed region. With this configuration, for example, even in a case where a plurality of power receiving apparatuses is placed as illustrated in FIG. 17B, it is possible to simultaneously transmit power to the plurality of power receiving apparatuses.

According to the above-described method, the power transmission apparatus 100 determines a power transmission circuit that transmits power to a placed power receiving apparatus, based on an upper limit of the number of power receiving apparatuses to which a power transmission circuit can transmit power, and a placed region. The configuration is not limited to this. The power transmission apparatus 100 can determine a power transmission circuit that transmits power to a power receiving apparatus, based on a power transmission circuit performing predetermined processing on the power receiving apparatus. For example, in a case where the number of power receiving apparatuses to which a power transmission circuit can simultaneously transmit power is one, the power transmission apparatus 100 determines whether the power transmission circuit is performing the following processing. Specifically, the power transmission apparatus 100 determines whether the power transmission circuit currently transmits an A-ping (being in the selection phase) or currently transmits a D-ping (being in the negotiation phase, the power transfer phase). In the processing in steps S1602 and S1605 illustrated in FIG. 18, in a case where the power transmission circuit transmits an A-ping or a D-ping, the power transmission apparatus 100 determines that the upper limit is not greater than the number of power receiving apparatuses (NO in steps S1602 and S1605), and in a case where the power transmission circuit currently transmits neither an A-ping nor a D-ping, the power transmission apparatus 100 determines that the upper limit is greater than the number of power receiving apparatuses (YES in steps S1602 and S1605). With this configuration, the power transmission apparatus 100 determines that a power transmission circuit already transmitting an A-ping or a D-ping cannot transmit power to a new power receiving apparatus any more.

In a case where the power transmission apparatus 100 of the present exemplary embodiment receives a signal strength packet in response to a transmitted D-ping, the power transmission apparatus 100 determines that the first power receiving apparatus 101a has been detected. Alternatively, the power transmission apparatus 100 can determine that an object exists in close proximity by using an A-ping.

In a case where power receiving apparatuses of the number exceeding the upper limit of the number of power receiving apparatuses to which a power transmission circuit can transmit power are placed, or in a case where power receiving apparatuses of the number exceeding the upper limit of the number of power receiving apparatuses to which power can be transmitted in the region are placed in the same region, as illustrated in FIG. 17D, the following processing can be performed. For example, the power transmission apparatus 100 can transmit a message about the number of power receiving apparatuses, to the second power receiving apparatus 101b which has been placed later, using a communication unit. Specifically, the message can be a message indicating that "the number of placed power receiving apparatuses has exceeded the upper limit of the number of power receiving apparatuses to which the power transmission apparatus or the power transmission circuit can simultaneously transmit power", or "the number of placed power receiving apparatuses has exceeded the upper limit of the number of power receiving apparatuses to which the power transmission apparatus or the power transmission circuit can transmit power in the same region". Alternatively, the message can simply indicates "many", "much" or "too much". The message can be a message about a distance between a plurality of power receiving apparatuses. Specifically, the message can indicates that "a distance between the placed power receiving apparatuses is close" or simply indicates "close" or "too close". The power transmission apparatus 100 can thus notify a power receiving apparatus of a reason why power transmission is not performed. The power receiving apparatus can recognize the reason why the power transmission apparatus 100 does not perform power transmission.

Furthermore, a power receiving apparatus that has received the message can display, on a user interface (UI) of the power receiving apparatus, a message prompting the user to place the power receiving apparatus at a different position on the power transmission coil unit 210 in such a manner that power transmission to the power receiving apparatus is executable. For example, a message indicating that "place a charged device at a different position", "a distance from another charged device (power receiving apparatus) is too close to perform wireless charging", or "place a charged device at a distance from another charged device (power receiving apparatus) to perform wireless charging" can be displayed.

An attribute of a charged device (power receiving apparatus) can be detected using the above-described identification packet, an extended identification packet, or a configuration packet defined in the WPC standard, and the attribute can be displayed on the UI. For example, in a case where the first power receiving apparatus 101a is a smartphone and the second power receiving apparatus 101b is a smart watch, the following message can be displayed on a UI of the smart watch. For example, a message indicating that "place the smart watch at a position different from the smartphone to perform wireless charging", "a distance from the smartphone is too close to perform wireless charging", or "place the smart watch at a distance from the smartphone to perform wireless charging" can be displayed.

The user who has checked the above-described message moves the second power receiving apparatus 101b in FIG. 17D to the common region 415, for example, the power transmission apparatus 100 is thus able to transmit power to the second power receiving apparatus 101b. In this manner, the power transmission apparatus notifies a power receiving apparatus of a reason why power transmission cannot be performed, and the notified power receiving apparatus displays, on a UI, the reason why power transmission cannot be performed, or a method for enabling power transmission, and also an attribute of a device. With this configuration, it is possible to perform power transmission to a power receiving apparatus. A similar effect can also be obtained by the similar message displayed in a case where both the first power receiving apparatus 101a and the second power receiving apparatus 101b are placed in the common region 415, and another power receiving apparatus is not placed, for example, which is not illustrated.

In FIG. 17B, the power transmission apparatus 100 switches a power transmission circuit that transmits power to the first power receiving apparatus 101a, from the first power transmission circuit 203 to the second power transmission circuit 205. Then, in accordance with the procedure illustrated in FIG. 5, the second power transmission circuit 205 starts the processing from the transmission of an A-ping (F500, F1705) (i.e., selection phase). Although the power transmission circuit is switched from the first power transmission circuit 203 to the second power transmission circuit 205, the power transmission apparatus 100 already recognizes information regarding the first power receiving apparatus 101a, and thus the second power transmission circuit 205 can start the processing from certain midpoint in the procedure illustrated in FIG. 5. Specifically, the negotiation processing and the calibration processing can be omitted, and power transmission in the power transfer phase can be started. With this configuration, it is possible to start power transmission to the first power receiving apparatus 101a promptly.

In a case where the first power receiving apparatus 101a is an apparatus including a display unit, such as a smartphone, and the second power receiving apparatus 101b is an apparatus without a display unit, such as wireless earphones, the power transmission apparatus can display the following information on a smartphone currently charged. Information to be displayed on the smartphone by the power transmission apparatus includes, for example, a message indicating that "the number of power receiving apparatuses has exceeded an upper limit of the number of power receiving apparatuses to which the power transmission apparatus can transmit power or an upper limit of the number of power receiving apparatuses to which a power transmission apparatus can transmit power in the same region", and information regarding a non-chargeable device. Then, the power transmission apparatus can display information regarding wireless earphones on a display unit of the smartphone currently charged. For example, a message indicating that "place wireless earphones at a position different from the smartphone to wirelessly charge the wireless earphones", or a message indicating that "a distance from the smartphone is too close to wirelessly charge the wireless earphones" can be displayed. For example, a message indicating that "place wireless earphones at a distance from the smartphone to wirelessly charge the wireless earphones" can be displayed. Thus, the user can check information even regarding a device (wireless earphones, etc.) not including a display unit.

The power transmission apparatus 100 can transmit, by using a communication unit, a message indicating that "the number of devices has exceeded an upper limit of the number of devices to which power can be transmitted", or "the number of devices has exceeded an upper limit of the number of devices to which power can be transmitted in the same region", to the second power receiving apparatus 101b that has placed later. Then, in a case where the number of devices has exceeded an upper limit of the number of devices to which a power transmission circuit can transmit power or an upper limit of the number of devices to which a power transmission circuit can transmit power in the same region, the power transmission apparatus 100 can display a reason why power transmission cannot be performed, on a display unit of a device to which power cannot be transmitted. For example, the power transmission apparatus 100 displays a message indicating that "the number of devices has exceeded the number of devices that can be wirelessly charged at a time", or "end wireless charging of another device to perform wireless charging".

The power transmission coils 402, 403, 405, 408, 409, and 411 in the common region 415 can exclusively connect to both of the first power transmission circuit 203 and the second power transmission circuit 205. Nevertheless, as long as either the first power transmission circuit 203 or the second power transmission circuit 205 can transmit power to a power receiving apparatus placed in the common region 415, each power transmission circuit needs not be connectable to all of the above-described power transmission coils. For example, it can be configured such that the first power transmission circuit 203 is connectable to the power transmission coils 402, 403, and 405, and the second power transmission circuit 205 is connectable to the power transmission coils 408, 409, and 411.

While the power receiving apparatus performs UI display based on a message transmitted using the communication unit of the power transmission apparatus, the message can be transmitted by a different communication unit that is different from the communication unit and is not compliant with the WPC standard. The different communication unit can be a communication unit in compliant with the Bluetooth® Low Energy standard, the Wi-Fi standard, or the Near Field Communication (NFC) standard.

While, in the present exemplary embodiment, the power transmission apparatus 100 including two power transmission circuits corresponding to the first power transmission circuit 203 and the second power transmission circuit 205, and including one common region corresponding to the common region 415 has been described as an example, the present exemplary embodiment is also applicable to a power transmission apparatus including an any number of the power transmission circuits, any number of the common regions, and any number of the dedicated regions.

The above-described first to fifth exemplary embodiments can be executed by combining arbitrary exemplary embodiments.

The present disclosure can also be implemented by processing of supplying a program for implementing one or more functions of the above-described exemplary embodiments, to a system or an apparatus via a network or a storage medium, and one or more processors in a computer of the system or the apparatus reading out the program and executing the program. The present disclosure can also be implemented by a circuit (e.g., ASIC) for implementing one or more functions.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, in a power transmission apparatus including a plurality of power transmission coils, appropriate control regarding wireless power transmission can be performed.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

The invention claimed is:

1. A power transmission apparatus comprising:
a first power transmission unit configured to perform wireless power transmission to a power receiving apparatus in a first region by using at least one of a plurality of coils; and
a second power transmission unit configured to perform wireless power transmission to a power receiving apparatus in a second region by using at least one of the plurality of coils,
wherein, while the first power transmission unit performs wireless power transmission to a first power receiving apparatus in a common region where the first region and the second region overlap, a detection of a second power receiving apparatus occurs in a region of the first region other than the common region, the first power transmission unit stops the wireless power transmission to the first power receiving apparatus and the second power transmission unit performs wireless power transmission to the first power receiving apparatus,
wherein the plurality of coils is included in at least one of the first region and the second region,
wherein a coil that is included in the common region among the plurality of coils is used for wireless power transmission to a power receiving apparatus by the first power transmission unit and the second power transmission unit,
wherein a coil that is included in the first region and not included in the common region among the plurality of coils is used for wireless power transmission to a power receiving apparatus by the first power transmission unit and is not used for wireless power transmission to a power receiving apparatus by the second power transmission unit, and
wherein a coil that is included in the second region and not included in the common region among the plurality of coils is used for wireless power transmission to a power receiving apparatus by the second power transmission unit and is not used for wireless power transmission to a power receiving apparatus by the first power transmission unit.

2. The power transmission apparatus according to claim 1, wherein the first power transmission unit performs wireless power transmission to the second power receiving apparatus placed in a region of the first region other than the common region.

3. The power transmission apparatus according to claim 1, wherein the first power transmission unit is configured to perform wireless power transmission to a first number of power receiving apparatuses in the first region, and
wherein, while the first power transmission unit performs wireless power transmission to the first number of power receiving apparatuses in the first region including the first power receiving apparatus in the common region, a detection of the second power receiving apparatus occurs in a region of the first region other than the common region, the second power transmission unit performs wireless power transmission to the first power receiving apparatus.

4. A control method of a power transmission apparatus, the control method comprising:
performing first power transmission to wirelessly transmit power to a power receiving apparatus in a first region by using at least one of a plurality of coils for wireless power transmission to a power receiving apparatus;
performing second power transmission to wirelessly transmit power to a power receiving apparatus in a second region by using at least one of the plurality of coils; and
in performing the first power transmission to a first power receiving apparatus in a common region where the first region and the second region overlap,
a detection of a second power receiving apparatus occurs in a region of the first region other than the common region, stopping the first power transmission to the first power receiving apparatus and performing the second power transmission to the first receiving apparatus;
wherein the plurality of coils is included in at least one of the first region and the second region,
wherein a coil that is included in the common region among the plurality of coils is used for performing wireless power transmission to a power receiving apparatus in performing the first power transmission and the second power transmission,
wherein a coil that is included in the first region and not included in the common region among the plurality of coils is used for wireless power transmission to a power receiving apparatus in performing the first power transmission and is not used for wireless power transmission to a power receiving apparatus in performing the second power transmission, and wherein a coil that is included in the second region and not included in the common region among the plurality of coils is used for wireless power transmission to a power receiving apparatus in performing the second power transmission and is not used for wireless power transmission to a power receiving apparatus in performing the first power transmission.

5. A non-transitory computer-readable storage medium storing a program for causing a computer to function as a power transmission apparatus comprising:
a first power transmission unit configured to perform wireless power transmission to a power receiving apparatus in a first region by using at least one of a plurality of coils; and
a second power transmission unit configured to perform wireless power transmission to a power receiving apparatus in a second region by using at least one of the plurality of coils,
wherein, while the first power transmission unit performs wireless power transmission to a first power receiving apparatus in a common region where the first region and the second region overlap, a detection of a second power receiving apparatus occurs in a region of the first region other than the common region, the first power transmission unit stops the wireless power transmission to the first power receiving apparatus and the second power transmission unit performs wireless power transmission to the first power receiving apparatus,
wherein the plurality of coils is included in at least one of the first region and the second region,
wherein a coil that is included in the common region among the plurality of coils is used for wireless power transmission to a power receiving apparatus by the first power transmission unit and the second power transmission unit,
wherein a coil that is included in the first region and not included in the common region among the plurality of coils is used for wireless power transmission to a power receiving apparatus by the first power transmission unit and is not used for wireless power transmission to a power receiving apparatus by the second power transmission unit, and wherein a coil that is included in the second region and not included in the common region among the plurality of coils is used for wireless power transmission to a power receiving apparatus by the second power transmission unit and is not used for wireless power transmission to a power receiving apparatus by the first power transmission unit.

\* \* \* \* \*